(12) United States Patent
Wada

(10) Patent No.: US 11,648,779 B2
(45) Date of Patent: May 16, 2023

(54) RECORDING APPARATUS AND PROGRAM FOR RECORDING APPARATUS

(71) Applicant: KYOCERA Corporation, Kyoto (JP)

(72) Inventor: Akinori Wada, Kirishima (JP)

(73) Assignee: Kyocera Corporation, Kyoto (JP)

( * ) Notice: Subject to any disclaimer, the term of this patent is extended or adjusted under 35 U.S.C. 154(b) by 162 days.

(21) Appl. No.: 17/297,844

(22) PCT Filed: Nov. 19, 2019

(86) PCT No.: PCT/JP2019/045248
§ 371 (c)(1),
(2) Date: May 27, 2021

(87) PCT Pub. No.: WO2020/110827
PCT Pub. Date: Jun. 4, 2020

(65) Prior Publication Data
US 2022/0009229 A1   Jan. 13, 2022

(30) Foreign Application Priority Data
Nov. 29, 2018 (JP) .............................. JP2018-223354

(51) Int. Cl.
*B41J 2/045* (2006.01)
*B41J 2/21* (2006.01)
*B41J 2/155* (2006.01)

(52) U.S. Cl.
CPC ........... *B41J 2/2132* (2013.01); *B41J 2/0456* (2013.01); *B41J 2/04508* (2013.01); *B41J 2/04588* (2013.01); *B41J 2/155* (2013.01); *B41J 2/2146* (2013.01)

(58) Field of Classification Search
CPC .................................................... B41J 2202/09
See application file for complete search history.

(56) References Cited

U.S. PATENT DOCUMENTS 7,722,145 B2 *   5/2010  Kubota ................ B41J 2/04588
                                                              347/12
2002/0054197 A1 *   5/2002  Okada ...................... B41J 3/407
                                                              347/101

(Continued)

FOREIGN PATENT DOCUMENTS

JP          04-133741 A      5/1992
JP          2012-187859 A    10/2012

*Primary Examiner* — Shelby L Fidler
(74) *Attorney, Agent, or Firm* — Volpe Koenig

(57) ABSTRACT

In a control part of a printer, a main area information holding part holds information prescribing a plurality of main areas which are obtained by dividing at least a portion in a facing surface of a head into a plurality of areas in a predetermined direction. A sub-area information holding part holds information prescribing a plurality of sub-areas which are obtained by dividing the main area into a plurality of areas in the predetermined direction. The initial setting part designates the settings relating to corrections in units of the main areas. In a case where correction amounts of darkness based on the initial setting are different between a first main area and a second main area which adjoin each other among the plurality of main areas, the re-setting part maintains or redesignates the settings relating to corrections designated with respect to the first main area in units of the sub-areas.

11 Claims, 18 Drawing Sheets

(56) References Cited

U.S. PATENT DOCUMENTS

| | | | |
|---|---|---|---|
| 2007/0139456 A1* | 6/2007 | Ebihara | B41J 2/2132 347/15 |
| 2008/0158276 A1* | 7/2008 | Kubota | B41J 2/175 347/9 |
| 2010/0247743 A1* | 9/2010 | Komori | B41J 2/0459 427/427.2 |
| 2012/0075375 A1 | 3/2012 | Ebisawa | |
| 2018/0250932 A1* | 9/2018 | Mizutani | B41J 2/04586 |
| 2019/0126609 A1* | 5/2019 | Mizutani | H04N 1/6041 |
| 2022/0001664 A1* | 1/2022 | Inoue | B41J 2/0455 |

\* cited by examiner

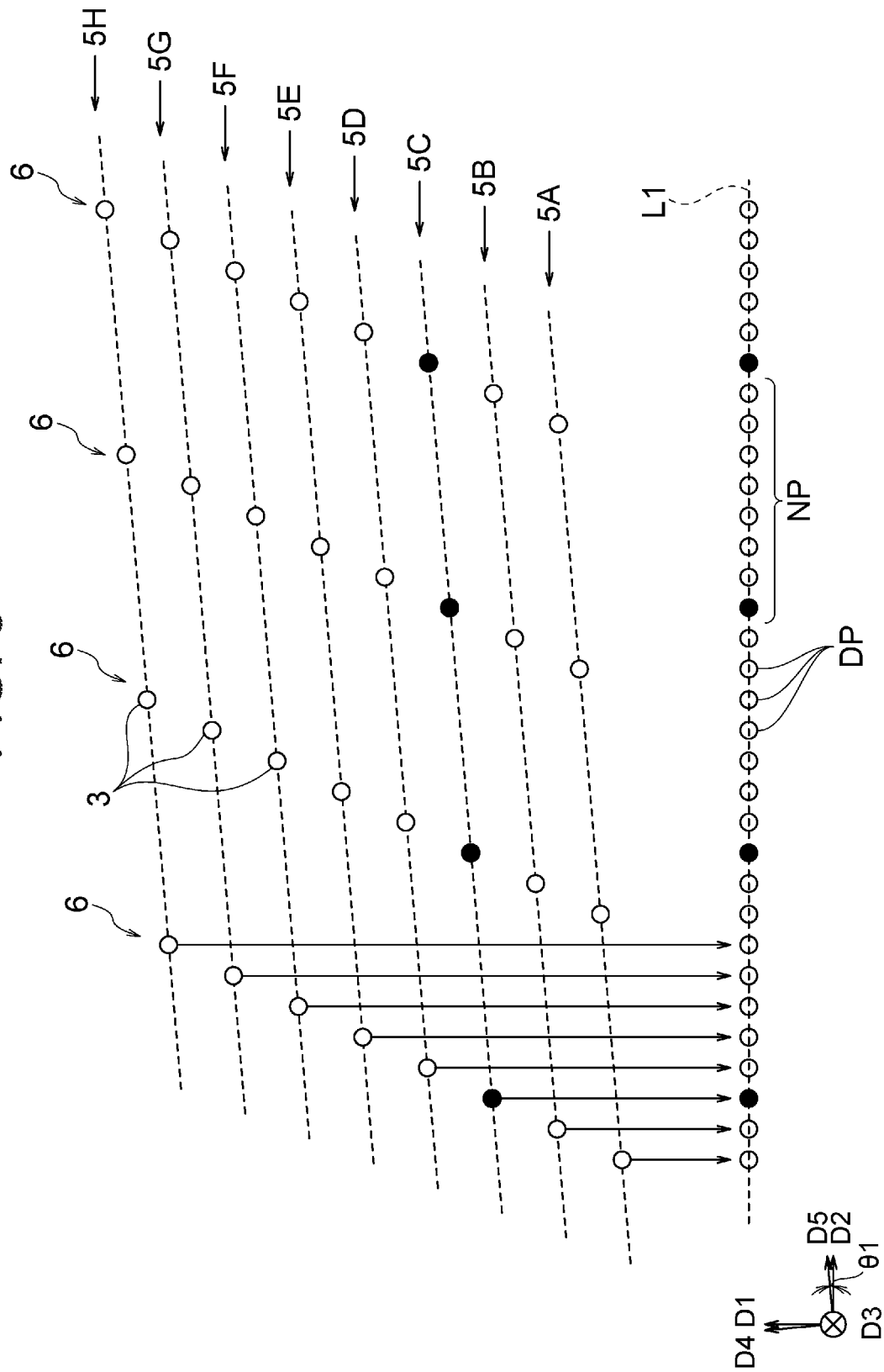

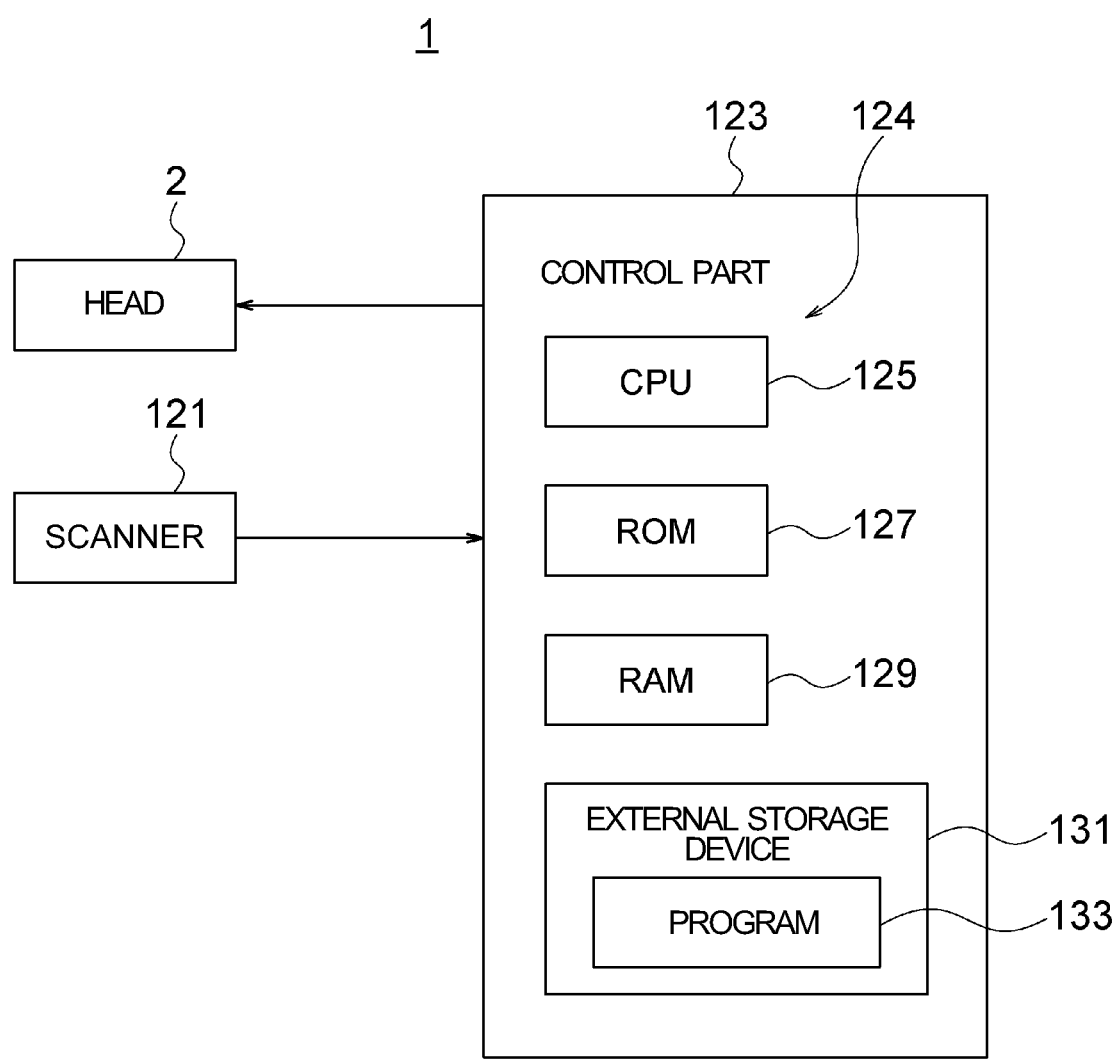

RECORDING APPARATUS AND PROGRAM FOR RECORDING APPARATUS

TECHNICAL FIELD

The present disclosure relates to a recording apparatus and a program for the recording apparatus.

BACKGROUND ART

Known in the art is a recording apparatus having a plurality of recording elements for individually forming a plurality of dots configuring an image on a recording medium. As such a recording apparatus, for example, there can be mentioned an inkjet head printer and thermal head printer. In an inkjet head printer, an ejection element including a nozzle ejecting ink is the recording element. In a thermal head, a heating part giving heat to a thermal paper or ribbon is the recording element.

In such printers, differences arise in sizes of dots or other features of the dots among the plurality of recording elements. As factors of occurrence of such variations of features of the dots, for example, in an inkjet printer, there can be mentioned manufacturing tolerances of the nozzles, differences of pressure among the plurality of nozzles due to the positions of the plurality of nozzles being different from each other relative to the channel supplying the ink, and variations of voltage input to driving parts which impart pressure to the ink for the different nozzles. Further, such differences of features of the dots for example appear in an image as unintended uneven print darkness.

In order to eliminate the unintended uneven print darkness described above, in Patent Literature 1, the plurality of recording elements are divided into a plurality of blocks (areas) for every predetermined number of elements, and the driving conditions of the recording elements are corrected for each block. Further, Patent Literature 2, in consideration of the occurrence of unintended uneven print darkness at the boundaries between the blocks when correcting the driving conditions for each block, proposes to form the boundaries between the blocks in intertwined shapes to thereby lower the visibility of the differences of darkness.

CITATION LIST

Patent Literature

Patent Literature 1: Japanese Patent Publication No. 04-133741
Patent Literature 2: Japanese Patent Publication No. 2012-187859

SUMMARY OF INVENTION

A recording apparatus according to one aspect of the present disclosure includes a head and a control part which controls the head. The head includes a facing surface which faces a recording medium and includes a plurality of recording elements which are mutually different in positions in a predetermined direction along the facing surface and individually form a plurality of dots configuring an image on the recording medium. The control part includes a correction part which corrects signal information prescribing driving signals to be individually input to the plurality of recording elements. The correction part includes a main area information holding part, sub-area information holding part, initial setting part, and re-setting part. The main area information holding part holds information prescribing a plurality of main areas obtained by dividing at least a portion of the facing surface into a plurality of areas in the predetermined direction. Each main area includes two or more recording elements belonging to it. The sub-area information holding part holds information prescribing a plurality of sub-areas obtained by dividing a main area into a plurality of areas in the predetermined direction for at least one of the plurality of main areas. Each sub-area includes two or more recording elements belonging to it. The initial setting part designates settings relating to correction including presence of any corrections in units of the main areas. When a correction amount of darkness based on the settings differs between a first main area and a second main area which adjoin each other among the plurality of main areas, the re-setting part maintains or redesignates the settings relating to correction which are designated with respect to the first main area in units of sub-areas. At this time, the re-setting part redesignates a setting for a sub-area in the first main area which adjoins the second main area to obtain a correction amount between the correction amount of its original setting and the correction amount of the second main area.

A program for a recording apparatus according to one aspect of the present disclosure is a program making a computer connected to the head function as the control part.

BRIEF DESCRIPTION OF DRAWINGS

FIG. 3 is a schematic view for explaining an arrangement of nozzles in the head in FIG. 2A.

FIG. 11 is a block diagram schematically showing a hardware configuration relating to a control system in the recording apparatus in FIG. 1.

DESCRIPTION OF EMBODIMENT

Figure 1A:
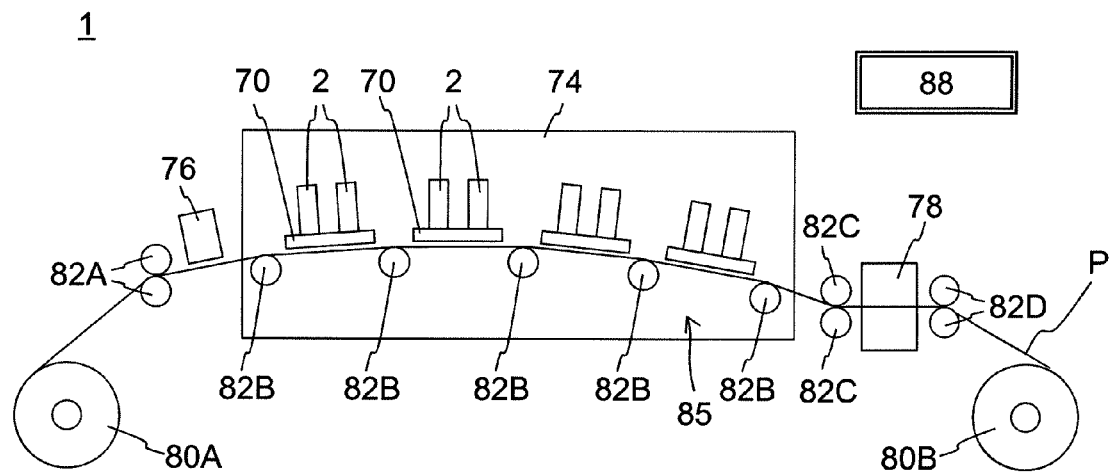
FIG. 1A and FIG. 1B are a side view and a plan view schematically showing a recording apparatus according to an embodiment.

Below, an embodiment of the present disclosure will be explained with reference to the drawings. Note that, the drawings used in the following explanation are schematic ones. The size ratios etc. in the drawings will not always coincide with the actual ones. Even among the plurality of drawings showing the same members, for exaggerating the shapes etc., sometimes the size ratios etc. will not coincide with each other.

(Overall Configuration of Printer)

Figure 1B:
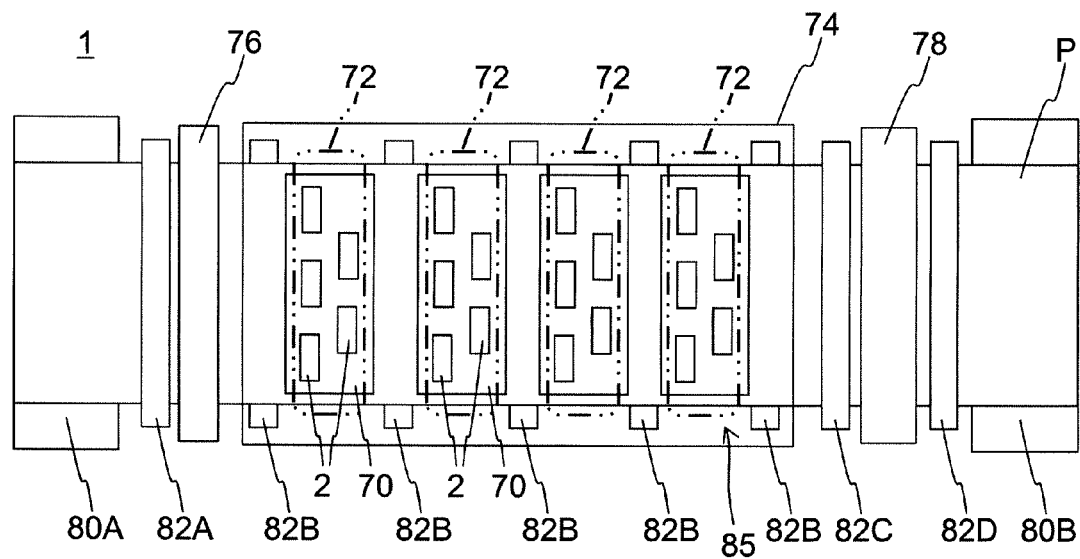

FIG. 1A is a schematic side view of a recording apparatus of a color inkjet printer 1 (below, sometimes simply referred to as a "printer") including liquid ejection heads 2 (below, sometimes simply referred to as "heads") according to an embodiment of the present disclosure. FIG. 1B is a schematic plan view of the printer 1. The printer 1 makes a recording medium of printing paper P move relative to the heads 2 by conveying the printing paper P from a paper feed roller 80A to a collection roller 80B. Note that, the paper feed roller 80A and collection roller 80B and the various types of rollers which will be explained later configure a movement part 85 which makes the printing paper P and the head 2 relatively move with respect to each other. The control device 88 controls the heads 2 based on images, text, and other data of printing data etc. to make the heads 2 eject liquid toward the printing paper P and make liquid droplets land onto the printing paper P to thereby perform printing or other recording on the printing paper P.

In the present embodiment, the heads 2 are fixed with respect to the printer 1, so the printer 1 becomes a so-called "line printer". As another embodiment of the recording apparatus, there can be mentioned a so-called "serial printer" which alternately performs an operation of moving the heads 2 so that they reciprocally move in a direction intersecting the conveyance direction of the printing paper P, for example, an almost perpendicular direction, and eject the liquid droplets in the middle of the movement and conveyance of the printing paper P.

At the printer 1, four flat plate-shaped head mounting frames 70 (below, sometimes simply referred to as the "frames") are fixed so as to be substantially parallel to the printing paper P. Each frame 70 is provided with not shown five holes. Five heads 2 are respectively mounted in the hole portions. The five heads 2 mounted on one frame 70 configure one head group 72. The printer 1 has four head groups 72, so 20 heads 2 in total are mounted.

Each head 2 mounted on a frame 70 is designed so that the portion ejecting the liquid faces the printing paper P. A distance between the head 2 and the printing paper P is made for example about 0.5 to 20 mm.

The 20 heads 2 may be directly linked with the control device 88 or may be connected through a distribution part distributing the printing data interposed between the two. For example, the control device 88 may send the printing data to one distribution part, and the one distribution part may distribute the printing data to the 20 heads 2. Further, for example, the control device 88 may distribute the printed data to four distribution parts corresponding to the four head groups 72, and each distribution part may distribute the printing data to the five heads 2 in the corresponding head group 72.

The heads 2 have elongated shapes in directions from the front side toward the deep portion in FIG. 1A and in the vertical direction in FIG. 1B. In one head group 72, three heads 2 are arranged along a direction intersecting the conveyance direction of the printing paper P, for example, an almost perpendicular direction, and the other two heads 2 are arranged one by one between each two heads 2 among the three heads 2 at positions offset along the conveyance direction. Expressed another way, in one head group 72, the heads 2 are arranged in a zigzag manner. The heads 2 are arranged so that the ranges which can be printed by the heads 2 are linked in a width direction of the printing paper P, that is, the direction intersecting the conveyance direction of the printing paper P, or so that the ends overlap, therefore printing without a clearance in the width direction of the printing paper P becomes possible.

The four head groups 72 are arranged along the conveyance direction of the printing paper P. Each head 2 is supplied with a liquid, for example, ink, from a not shown liquid supply tank. The heads 2 belonging to one head group 72 are supplied with ink having the same color. Inks of four colors can be printed with by the four head groups 72. The colors of the ink ejected from the head groups 72 are for example magenta (M), yellow (Y), cyan (C), and black (K). If such inks is printed by controlling of the control device 88, a color image can be printed.

The number of heads 2 mounted in the printer 1 may be one as well so far as the printing is carried out by one color in a range where printing by one head 2 is possible. The number of the heads 2 included in the head groups 72 and the number of the head groups 72 can be suitably changed according to the object for printing or the printing conditions. For example, in order to perform further multi-color printing, the number of the head groups 72 may be increased as well. Further, if a plurality of head groups 72 performing printing in the same color are arranged and the printing is alternately carried out in the conveyance direction, even if the heads 2 having the same performances are used, the conveyance speed can be made faster. Due to this, the printing area per time can be made larger. Further, a plurality of head groups 72 performing printing in the same color may be prepared and arranged offset in the direction intersecting with the conveyance direction to thereby raise the resolution in the width direction of the printing paper P.

Further, other than printing by color ink, printing may be carried out by the heads 2 by a coating agent or other liquid uniformly or by patterning in order to treat the surface of the printing paper P. As the coating agent, for example, when using as the recording medium one into which the liquid has a hard time impregnating, use can be made of an agent forming a liquid receiving layer so that the liquid is easily fixed. Otherwise, as the coating agent, when use is made of a recording medium into which the liquid is easily impregnated, use can be made of an agent forming a liquid permeation suppression layer so as to prevent a liquid from bleeding too much or prevent the liquid from mixing with another liquid which impacts the vicinity too much. The coating agent may be uniformly coated by a coating machine 76 controlled by the control device 88 other than the printing by the heads 2 as well.

The printer 1 performs printing on the recording medium of the printing paper P. The printing paper P is in a state wound around the paper feed roller 80A. The printing paper P sent out from the paper feed roller 80A passes the lower side of the heads 2 mounted in the frame 70, then passes between the two conveyance rollers 82C, and is finally collected by the collection roller 80B. At the time of printing, by turning the conveyance rollers 82C, the printing paper P is conveyed at a constant velocity and is printed by the heads 2.

Next, details of the printer 1 will be explained in order of conveyance of the printing paper P. The printing paper P sent out from the paper feed roller 80A passes between two guide rollers 82A and then passes under the coating machine 76. The coating machine 76 coats the coating agent explained above on the printing paper P.

Then, the printing paper P enters into a head chamber 74 accommodating the frames 70 in which the heads 2 are mounted. The head chamber 74 is linked with the external portion in portions such as parts where the printing paper P enters and exits. However, the head chamber 74 is substantially a space isolated from the external portion. The head chamber 74, according to need, is controlled in control factors such as temperature, humidity, atmospheric pressure, etc. by the control device 88 or the like. In the head chamber 74, compared with the external portion where the printer 1 is set, the influence by disturbance can be reduced. Therefore, a range of fluctuation of the control factors explained above can be made narrower than that in the external portion.

In the head chamber 74, five guide rollers 82B are arranged. The printing paper P is conveyed over the guide rollers 82B. The five guide rollers 82B are arranged so as to project at the centers toward the direction in which the frames 70 are arranged when viewed from the side. Due to this, the printing paper P conveyed over the five guide rollers 82B becomes arc shaped when viewed from the side. Therefore, by applying tensile force to the printing paper P, the printing paper P between each two guide rollers 82B is stretched so as to become planar shaped. Between the two guide rollers 82B, one frame 70 is arranged. The frames 70 are changed little by little in the set angles so as to become parallel to the printing paper P which is conveyed under them.

The printing paper P which exits the head chamber 74 passes between the two conveyance rollers 82C, passes through the interior of a drying machine 78, passes between the two guide rollers 82D, and is collected by the collection roller 80B. The conveyance rate of the printing paper P is made for example 100 m/min. Each roller may be controlled by the control device 88 or may be manually operated by a human worker.

By drying in the drying machine 78, at the collection roller 80B, sticking of the sheets of printing paper P which are taken up superposed or rubbing off of undried liquid can be made harder to occur. For printing at a high speed, the drying must also be carried out fast. In order to make the drying faster, in the drying machine 78, the dryings may be carried out in order by a plurality of drying methods or the drying may be carried out by using a plurality of drying methods together. As the drying method used at that time, for example, there are blowing of hot air, emission of infrared rays, contact with a heated roller, and the like. When infrared rays are emitted, infrared rays in a special frequency range may be emitted so as to reduce damage to the printing paper P while making the drying faster. When the printing paper P is made to contact the heated roller, the time of transfer of heat may be made longer as well by conveying the printing paper P along the cylindrical surface of the roller. The range where the paper is conveyed along the cylindrical surface of the roller is preferably a ¼ turn of the cylindrical surface of the roller. Further, preferably, it is made a ½ turn or more of the cylindrical surface of the roller. When printing a UV curable ink or the like, in place of the drying machine 78 or in addition to the drying machine 78, a UV light source may be arranged as well. The UV light source may be arranged between each two frames 70 as well.

The printer 1 may be provided with a cleaning part cleaning the heads 2 as well. The cleaning part for example performs wiping or cleaning by capping. Wiping for example wipes the surface of the portion to which the liquid is ejected, for example, the facing surface 2a (explained later), by a wiper having flexibility to thereby remove the liquid deposited on the surface. The cleaning by capping is for example carried out in the following way. First, a cap is placed so as to cover the portion to which the liquid is ejected, for example the facing surface 2a (this will be referred to as "capping") to thereby form a space which is substantially sealed by the facing surface 2a and the cap. By repeating the ejection of the liquid in such a state, liquid which had become higher in viscosity than the standard state, foreign substances or the like, which had been clogged in the nozzle 3 (explained later) are removed. By capping performed, the liquid during cleaning is not splattered in the printer 1 so it is possible to make the liquid harder to deposit on the printing paper P and the rollers and other parts of the conveyance mechanism. The facing surface 2a finished being cleaned may further be wiped as well. The wiping or the cleaning by capping may be carried out by a human operator manually operating the wiper or cap attached to the printer 1 or may be automatically carried out by the control device 88.

The recording medium may be a rolled textile or the like as well other than the printing paper P. Further, in place of direct conveyance of the printing paper P, the printer 1 may directly run a conveyance belt and place the recording medium on the conveyance belt to convey the same. When performing conveyance in this way, a sheet, cut textile, wood, tile, and the like can be used as the recording media as well. Further, wiring patterns etc. of an electronic apparatus may be printed by ejecting a liquid containing conductive particles from the heads 2 as well. Furthermore, it is possible to eject a predetermined amount of liquid chemical agent or liquid containing a chemical from the heads 2 toward a reaction vessel or the like to cause a reaction and the like to prepare a chemical or pharmaceutical.

Further, by attaching a position sensor, speed sensor, temperature sensor, and the like to the printer 1, the control device 88 may control the parts in the printer 1 in accordance with the states of the parts in the printer 1 which are seen from the information from the sensors. For example, in a case where the temperature of the heads 2, the temperature of the liquid in the liquid supply tank for supplying the liquid to the heads 2, the pressure applied to the heads 2 by the liquid in the liquid supply tank, and the like exert an influence upon the ejection characteristics of the liquid ejected, that is, the ejection amount, ejection speed, and the like, the driving signal for ejecting the liquid may be changed in accordance with those information as well.

(Arrangement of Nozzles)

Figure 2A:
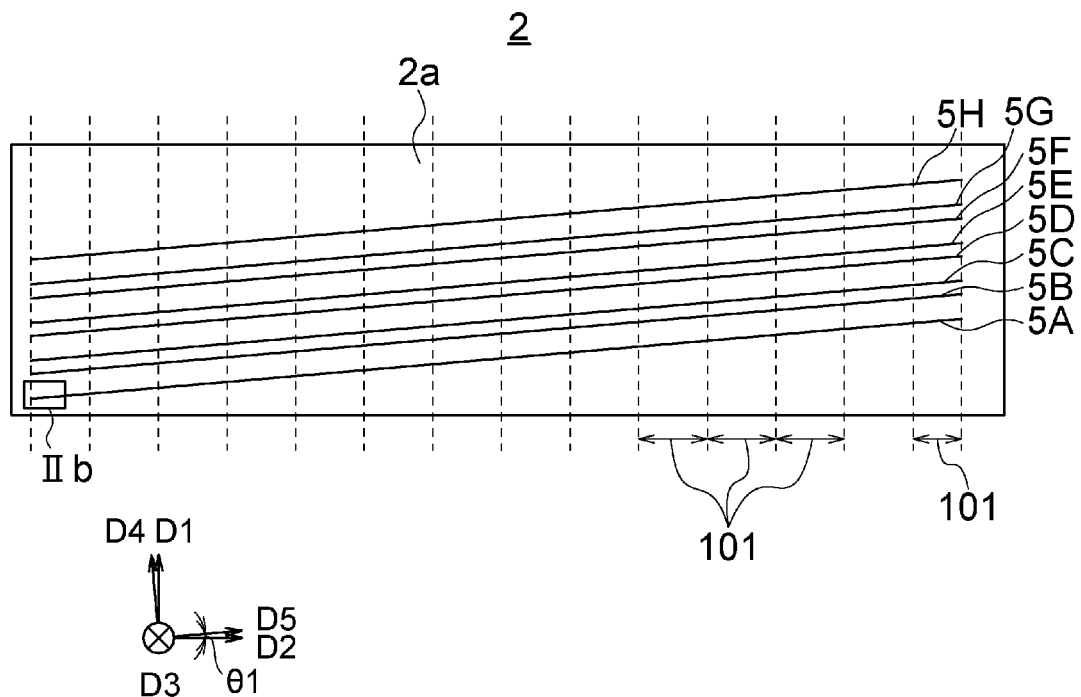
FIG. 2A is a plan view showing a facing surface of a head in the recording apparatus in FIG. 1A.
Figure 2B:
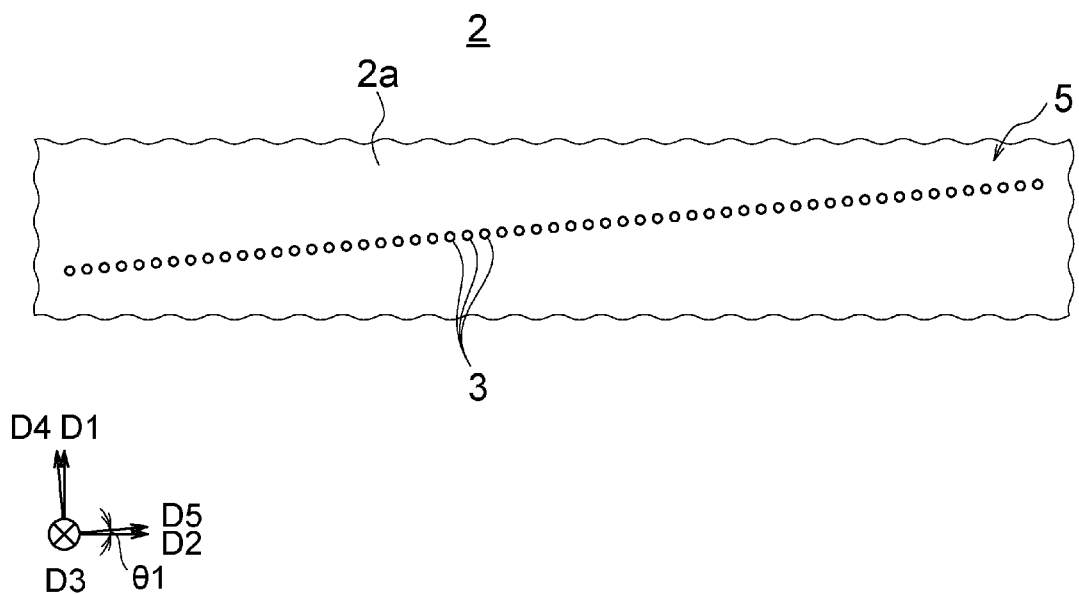
FIG. 2B is an enlarged view of a region IIb in FIG. 2A.

FIG. 2A is a plan view showing the facing surface 2a in a head 2 which faces the recording medium. FIG. 2B is an enlarged view of a region IIb in FIG. 2A. In these views, for convenience, an orthogonal coordinate system comprised of a D1 axis, D2 axis, D3 axis, etc. is attached. The D1 axis is defined to be parallel to a direction of relative movement of the head 2 and the recording medium. The relationships between positive/negative of the D1 axis and the advancing direction of the recording medium relative to the head 2 do not particularly matter in the explanation of the present embodiment. The D2 axis is defined so as to be parallel to the facing surface 2a and the recording medium and perpendicular to the D1 axis. Also, the positive/negative of the D2 axis does not particularly matter either. The D3 axis is defined so as to be perpendicular to the facing surface 2a and the recording medium. The −D3 side (front side on the drawing sheets in FIG. 2A and FIG. 2B) is made a direction from the head 2 toward the recording medium. In the head 2, any direction may be used as "above" or "below". For convenience, sometimes use will be made of terms such as the "lower surface" using the +D3 side as above.

The facing surface 2a is provided with a plurality of nozzles 3 ejecting ink droplets. The plurality of nozzles 3 are arranged while making their positions in the D2 direction different from each other. Accordingly, by relatively moving the head 2 and the recording medium in the D1 direction by the movement part 85 while ejecting the ink droplets from the plurality of nozzles 3, any two-dimensional image may be formed.

More specifically, the plurality of nozzles 3 are arranged in a plurality of rows (eight rows in the example shown). That is, a plurality of nozzle rows 5A to 5H (hereinafter, sometimes A to H will be omitted) are configured by the plurality of nozzles 3. Each nozzle 3 corresponds to one dot on the recording medium. Note that, in FIG. 2A, the nozzle rows 5 are shown by straight lines since the nozzles 3 are very small relative to the facing surface 2a. Further, in the enlarged view of FIG. 2B, the nozzles 3 are drawn larger than the actual ones (drawn larger relative to the pitch).

The plurality of nozzle rows 5 are for example substantially parallel to each other. Further, they have equal lengths to each other. In the example shown, the nozzle rows 5 are inclined relative to the D2 direction. In FIG. 2A and FIG. 2B, a D5 axis which is substantially parallel to the nozzle rows 5 and a D4 axis which is perpendicular to the D5 axis are attached. The inclination angle θ1 of the nozzle rows 5 relative to the D2 axis may be suitably set. Note that, such an inclination need not be provided either.

In the example in FIG. 2A and FIG. 2B, the sizes of the intervals among the plurality of nozzle rows 5 are not equal. The plurality of intervals are made the same size for every other row. Such a configuration is for example caused for convenience of arrangement of the channels inside the heads 2. However, the sizes of the plurality of intervals may be made equal as well.

In each nozzle row 5, a relatively large number of nozzles 3 are provided. For example, the number of the nozzles 3 in each nozzle row 5 is at least larger than the number of the nozzle rows 5 (number of rows). The number of the nozzles 3 in each nozzle row 5 may be suitably set. Giving one example, it is 500 to 1000.

In each nozzle row 5, the plurality of nozzles 3 are linearly arranged. Further, in each nozzle row 5, the pitch of the plurality of nozzles 3 is constant in the D5 (D2) direction. Further, the pitch is the same among the plurality of nozzle rows 5. However, for example, in each nozzle row 5, the plurality of nozzles 3 may be offset (varied) from the positions of constant pitch on the line by a relatively very small amount (for example an amount smaller than the pitch) in the direction of extension of the line or a direction crossing the line. Further, such an offset may be different among the plurality of nozzle rows 5 as well.

FIG. 3 is a schematic view for explaining the relationships among the plurality of nozzle rows 5. Note that, the nozzles 3 in the nozzle row 5C, unlike the other nozzles 3, are indicated by black circles. However, this is only for easier explanation.

As indicated by the arrows, when the nozzles 3 in the plurality of nozzle rows 5 are projected in the D1 direction (direction of relative movement of the head 2 and the recording medium) onto a line L1 which is parallel to the D2 direction, the plurality of nozzles 3 are arranged in a sequence by which the nozzles 3 in the same nozzle row 5 are not successive. For example, as in the example shown, the nozzles 3 in the plurality of nozzle rows 5 are arranged on the line L1 in the constant orders assigned to the plurality of nozzle rows 5. That is, in a range NP including the same number of positions DP of the nozzles 3 on the line L1 as the number of the nozzle rows 5, one each of the nozzles 3 in the nozzle rows 5 are included. The sequence of the nozzle rows 5 within the range NP is the same among the plurality of ranges NP. However, it is also possible to make the sequence of the nozzle rows 5 in the positions DP on the line L1 not constant. The pitch of the positions DP is for example constant. However, the pitch of the positions DP may fluctuate by a very small amount (amount smaller than the pitch) as well.

As will be understood from the above explanation, due to the provision of the "n" number of nozzle rows 5, the dot density on the line L1 becomes "n" times the dot density in each nozzle row 5. The dot density may be suitably set. When explaining one example, the dot density in the D2 direction in each nozzle row 5 is 100 dpi to 200 dpi while the dot density in the D2 direction realized by the eight nozzle rows 5 is 800 dpi to 1600 dpi.

Note that, in the example shown, for convenience of explanation, the order of arrangement of the plurality of nozzle rows 5 in the D1 direction and the sequence of the nozzle rows 5 in the positions DP on the line L1 are made the same. From another viewpoint, nozzle columns 6 which substantially linearly extend in directions intersecting the D5 axis are configured by the plurality of nozzles 3. However, the above two types of arrangement orders may be different from each other as well. From another viewpoint, the linear shaped nozzle columns 6 need not be configured either.

(Outline of Structure of Head)

Figure 4:
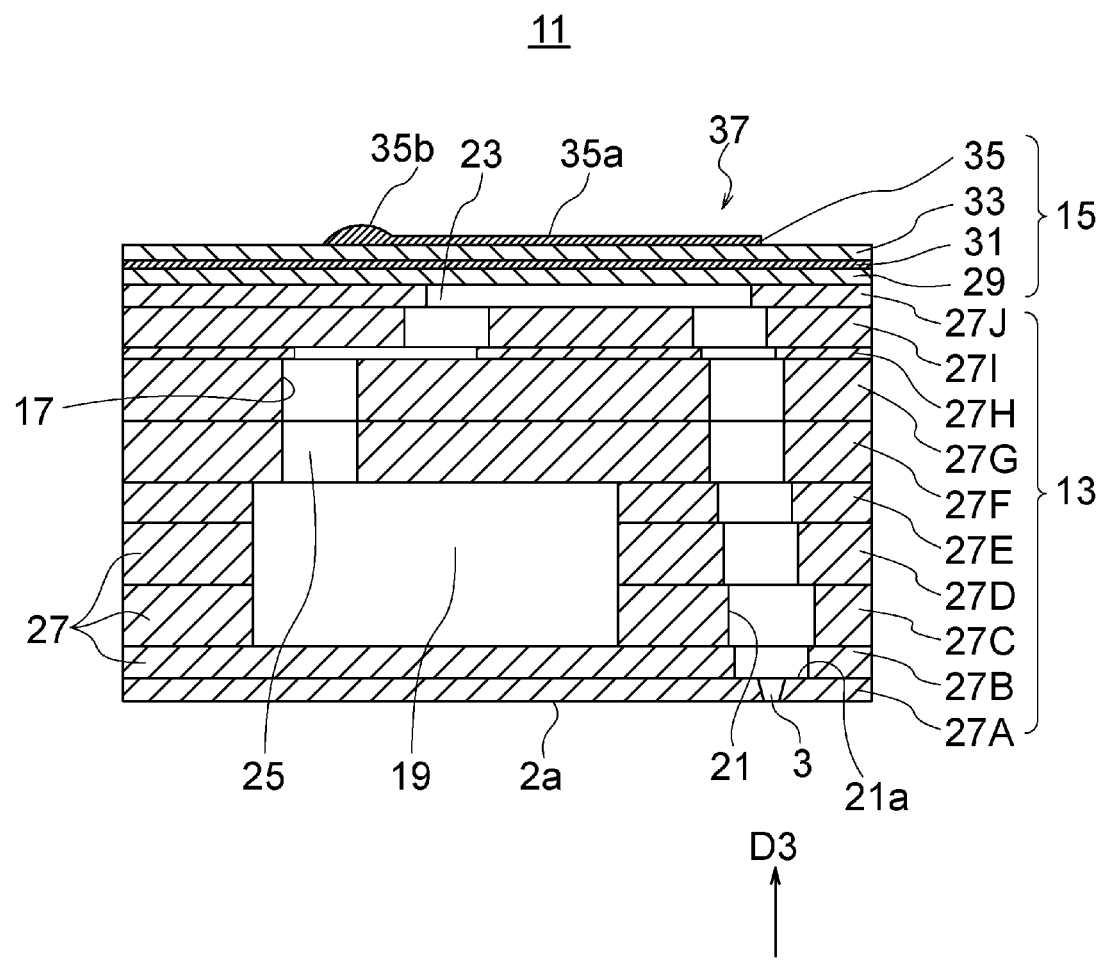
FIG. 4 is a schematic cross-sectional view showing a portion in the head in an enlarged manner.

FIG. 4 is a schematic cross-sectional view showing a portion of a head 2 in an enlarged manner. Note that, the lower part on the drawing sheet in FIG. 4 is the side facing the recording medium (−D3 side).

The head 2 is a piezo type head giving pressure to the ink by mechanical distortion of piezoelectric elements. The head 2 has a plurality of ejection elements 11 individually provided for the nozzles 3. FIG. 4 shows one ejection element 11.

The plurality of ejection elements 11, although not particularly shown, for example, substantially configure a row of the ejection elements 11 for each nozzle row 5. The orientations and number of the ejection elements 11 in each row may be suitably set together with design of the route of a common channel 19 which will be explained later and the like. For example, in each row of the ejection elements 11, the ejection elements 11 may have the same orientations as each other or may alternately have inverse orientations. Further, one row of the ejection elements 11 may be provided with respect to one nozzle row 5, or two rows of the ejection elements 11 may be provided at the two sides of one nozzle row 5 in inverse orientations to each other. Two rows of ejection elements 11 corresponding to two mutually adjoining nozzle rows 5 may be configured as if they were one row by alternate arrangement of each of the ejection elements 11 in the two rows.

The head 2, from another viewpoint, has channel members 13 forming spaces for storing the ink and actuators 15 which give pressure to the ink stored in the channel members 13. The plurality of ejection elements 11 are configured by the channel members 13 and actuators 15.

(Configuration of Channel Member)

In the internal portion of the channel member 13, a plurality of individual channels 17 (one is shown in FIG. 4) and a common channel 19 communicated with the plurality of individual channels 17 are formed. The individual channel 17 is provided for each ejection element 11, and the common channel 19 is provided common to the plurality of ejection elements 11.

Each individual channel 17 has the already explained nozzle 3, a partial channel 21 having a bottom surface 21a in which the nozzle 3 opens, a pressurizing chamber 23 communicated with the partial channel 21, and a communication path 25 communicating the pressurizing chamber 23 and the common channel 19 with each other.

The plurality of individual channels 17 and common channel 19 are filled with ink. By the pressure being given to the ink due to a change of the volume of the pressurizing chamber 23, the ink is sent out from the pressurizing chamber 23 to the partial channel 21 and ink droplets are ejected from the nozzle 3. Further, the pressurizing chamber 23 is refilled with ink from the common channel 19 through the communication path 25.

The cross-sectional shapes or planar shapes of the plurality of individual channels 17 and common channel 19 may be suitably set. The configurations of the plurality of individual channels 17 (orientations when viewed on a plane are excluded) are for example substantially the same as each other. However, the inclination of the partial channel 21 and other parts may be different from each other as well.

The pressurizing chamber 23 is for example formed to a constant thickness in the D3 direction. Further, when viewed on a plane, it is made substantially diamond shaped or elliptical or the like. An end part of the pressurizing chamber 23 in the plane direction is communicated with the partial channel 21, and the end part on the opposite side is communicated with the communication path 25. A portion of the communication path 25 is made a constricted portion smaller in cross-sectional area perpendicular to the direction of flow than the areas of the common channel 19 and pressurizing chamber 23.

The partial channel 21 extends from the bottom surface (surface on the −D3 side) of the pressurizing chamber 23 to the facing surface 2a side. The shape of the cross-section (cross-section perpendicular to the D3 axis) of the partial channel 21 may be suitably set. Although not particularly shown, for example, it is circular or rectangular. Further, the cross-sectional shape (including dimensions) may be constant over the length (substantially the D3 direction) of the partial channel 21 or may change. In the example shown, it somewhat changes. The partial channel 21 may extend parallel to the D3 axis or may extend with a suitable inclination relative to the D3 axis.

The nozzle 3 opens at the bottom surface 21a of the partial channel 21 with a smaller area than the bottom surface 21a. The shape of the nozzle 3 may be suitably set. For example, the nozzle 3 is circular when viewed on a plane and becomes smaller in diameter the more to the facing surface 2a side. That is, the shape of the nozzle 3 is substantially a truncated cone shape. Note that, the nozzle 3 may be configured so that a portion on the front end side (−D3 side) increases in diameter the more to the front end side as well.

The common channel 19 for example extends along the facing surface 2a below the pressurizing chamber 23. Although not particularly shown, for example, the common channel 19 is configured so as to branch in a manifold manner. The branched portions for example extend along the nozzle rows 5. In a case where the nozzle columns 6 are configured etc., the above branched portions may extend along the nozzle columns 6 in place of the nozzle rows 5 as well.

The channel member 13 is for example configured by a plurality of plates 27A to 27J (below, sometimes A to J will be omitted) stacked on each other. In the plates 27, via holes and/or recessed portions configuring the plurality of individual channels 17 and common channel 19 are formed. The thicknesses and stacked number of the plurality of plates 27 may be suitably set in accordance with the shapes etc. of the plurality of individual channels 17 and common channel 19. The plurality of plates 27 may be formed by suitable materials. For example, they are formed by metal, resin, ceramic, or silicon.

The plate 27 which is positioned closest to the −D3 side among the plurality of plates 27 will be sometimes referred to as the "nozzle plate 27A". The nozzle plate 27A for example configures the facing surface 2a by its lower surface and configures the bottom surface 21a of the partial channel 21 by its upper surface. The nozzles 3 are configured by holes penetrating through the nozzle plate 27A in its thickness direction.

(Configuration of Actuator)

The actuator 15 is for example configured by a unimorph type piezoelectric element which displaces in a flexural mode. Specifically, for example, the actuator 15 has a vibration plate 29, common electrode 31, piezoelectric body 33, and a plurality of individual electrodes 35 stacked in order from the pressurizing chamber 23 side.

The vibration plate 29, common electrode 31, and piezoelectric body 33 are for example provided common to the plurality of pressurizing chambers 23 (plurality of ejection elements 11) so as to cover the plurality of pressurizing chambers 23. On the other hand, an individual electrode 35 is provided for each pressurizing chamber 23 (ejection element 11). Note that, in the actuator 15, a part corresponding to one ejection element 11 will be sometimes referred to as a "pressurization element 37". The configurations of the plurality of pressurization elements 37 (orientations when viewed on a plane are excluded) are the same as each other.

The vibration plate 29, for example, closes the upper surface opening of each pressurizing chamber 23 by superposition on the upper surface of the channel member 13. Note that, the pressurizing chamber 23 may be closed in the upper surface opening by the plate 27 and the vibration plate 29 superimposed on it. However, in this case as well, that plate 27 may be grasped as a portion of the vibration plate, and the pressurizing chamber 23 may be grasped as being closed by the vibration plate.

The piezoelectric body 33 has the thickness direction (D3 direction) as its polarization direction. Accordingly, for example, when voltage is supplied to the common electrode 31 and individual electrodes 35 and an electric field is made act with respect to the piezoelectric body 33 in the polarization direction, the piezoelectric body 33 contracts in the plane (in the plane perpendicular to the D3 axis). By this contraction, the vibration plate 29 flexes so as to project to the pressurizing chamber 23 side. As a result, the volume of the pressurizing chamber 23 changes.

The common electrode 31 extends over the plurality of pressurizing chambers 23 as already explained and is given a constant potential (for example a reference potential). Each individual electrode 35 includes an individual electrode body 35a positioned on the pressurizing chamber 23 and a lead-out electrode 35b led out from that individual electrode body 35a. Although not particularly shown, when viewed on a plane, the shape and size of the individual electrode body 35a are substantially equal to the pressurizing chamber 23. By the potentials (driving signals) being individually given to the plurality of individual electrodes 35, ejection operations of ink droplets from the plurality of nozzles 3 are individually controlled.

The vibration plate 29, common electrode 31, piezoelectric body 33, and individual electrodes 35 may be formed by suitable materials. For example, the vibration plate 29 is formed by ceramic, silicon oxide, or silicon nitride. The common electrode 31 and individual electrodes 35 are for example formed by platinum or palladium. The piezoelectric body 33 is for example formed by PZT (lead zirconate titanate) or another ceramic.

The actuator 15, for example, although not particularly shown, is connected with a flexible printed circuit board (FPC) which is arranged facing the actuator 15. Specifically, the lead-out electrodes 35b are connected, and the common electrode 31 is connected through a not shown via conductor or the like. Further, the control device 88, for example, gives a constant potential to the common electrode 31 and individually inputs driving signals to the plurality of individual electrodes 35 through a not shown driving IC (integrated circuit) mounted in the FPC.

(Ejection Operation)

Figure 10A:
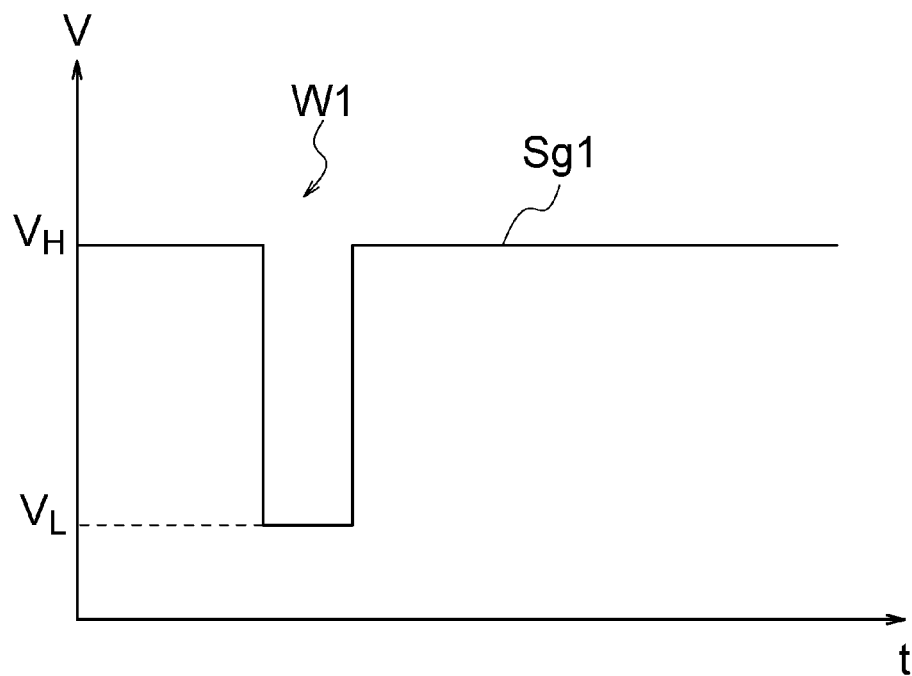
FIG. 10A and FIG. 10B are schematic views for explaining the correction method designated in initial settings.

The driving signals are supplied in a constant cycle synchronized with the conveyance speed of the printing paper P. The waveform of the driving signals may be made waveforms of various known types. Here, a driving signal for so-called pull-push will be explained. FIG. 10A is a schematic view showing an example of the waveform of a driving signal Sg1. In this graph, an abscissa shows the time "t", and an ordinate shows a potential V of the driving signal Sg1.

Before an ejection request is issued, the driving signal Sg1 (from another viewpoint, the individual electrode 35) is rendered a potential higher than the common electrode 31 (below, referred to as a "high potential $V_H$"). Further, whenever an ejection request is issued, the potential of the individual electrode 35 is rendered a lower potential than the high potential $V_H$ (below, called a "low potentials $V_L$") and then rendered the high potential $V_H$ again at a predetermined timing. The low potential $V_L$ may be suitably set. For example, it is the same potential as that of the common electrode 31.

Before the ejection request, the actuator 15 is shaped flexing to the pressurizing chamber 23 side due to the driving signal Sg1 being rendered the high potential $V_H$.

Next, by the driving signal Sg1 becoming the low potential $V_L$, the actuator 15 returns (begins to return) to the original (flat) shape, therefore the volume of the pressurizing chamber 23 increases. In turn, a negative pressure is given to the liquid in the pressurizing chamber 23. This being so, the liquid in the pressurizing chamber 23 begins to vibrate by a natural vibration period. Next, the volume of the pressurizing chamber 23 becomes the maximum and the pressure becomes substantially zero. Further, the volume of the pressurizing chamber 23 begins to decrease and the pressure becomes higher.

By the driving signal Sg1 being rendered the low potential $V_L$ and then becoming the high potential $V_H$, the actuator 15 begins to flex to the pressurizing chamber 23 side again. The vibration which was applied first and the vibration which was applied next overlap, therefore a larger pressure is applied to the liquid. This pressure is propagated in the partial channel 21 and thereby makes the nozzle 3 eject the liquid.

That is, by using the high potential $V_H$ as the reference and supplying the driving signal Sg1 having a pulse waveform which becomes the low potential $V_L$ for a constant period to an individual electrode 35, liquid droplets can be ejected. When this pulse width is made a half of the time of the natural vibration period of the liquid in the pressurizing chamber 23, that is, the AL (acoustic length), in principle, the ejection velocity and ejection amount of the liquid become the maximum.

Note that, the pulse width in actuality is made a value of about 0.5 AL to 1.5 AL since there are other factors to be considered as well such as ejected liquid droplets being gathered into one. Further, the ejection amount can be reduced by the pulse width being controlled to a value out of AL, therefore the pulse width is made a value out of the AL in order to reduce the ejection amount.

The darkness intended in the image (including text as well) formed on the recording medium may be realized by a suitable method. For example, it may be realized by the sizes of the dots on the recording medium, may be realized by a change of the number of dots per constant area (rough/fine), or these may be combined. The sizes of the dots may be adjusted by the size of one liquid droplet, may be adjusted by the number of the liquid droplets deposited onto one position, or these may be combined.

Further, from another viewpoint, the intended darkness may be realized by the size of the liquid droplets ejected from the nozzles 3 adjusted according to the potential difference between the high potential $V_H$ and the low potential $V_L$ of the driving signal Sg1 or the like, may be realized by change of the number of the liquid droplets adjusted according to the wave number included in the driving signal Sg1 corresponding to one time's worth of ejection request, may be realized by change of the number of the ejection elements 11 performing the ejection operation per constant area, or these may be combined.

(Outline of Method of Correction of Darkness)

In the above printer 1, sometimes the ejection characteristics vary among the plurality of ejection elements 11. For example, even if formation of dots having the same size on the recording medium is intended, a difference arises in sizes of the dots among the plurality of ejection elements 11. As the reason for that, for example, there can be mentioned manufacturing tolerances of the nozzles 3, differences of the positions of the individual channels 17 relative to the common channel 19, and variations of potentials of the driving signals Sg1. Further, such differences of features of the dots for example appear as unintended uneven print darkness.

In order to eliminate the unintended uneven print darkness, it may be considered to individually correct the driving signals input to the plurality of ejection elements 11 (for each ejection element 11). In this case, however, for example, the correction amount must be calculated and the correction amount must be stored for each ejection element 11, therefore the processing load increases, and/or the amount of the memory used increases.

Therefore, as shown in FIG. 2A, the facing surface 2a of the head 2 is divided into a plurality of areas in a predetermined direction (D2 direction in the example shown) to set a plurality of main areas 101. Further, settings relating to correction are designated in units of the main areas 101. By doing this, the processing load is lightened and/or the amount of the memory used can be reduced.

The settings relating to correction mean for example settings of presence of any corrections and settings of the correction amounts. In the processing of the computer, "designating the settings relating to correction" may be for example storing information showing presence of any corrections and correction amounts (for example, values of variables showing presence of any corrections and correction amounts) in the storage part. The later explained "maintaining and redesignating the settings" may be for example maintaining or update of such information stored in the storage part.

Note that, settings of presence of any corrections may be grasped as settings of whether the correction amount is to be made 0 and may be included in the concept of settings of the correction amounts. The explanation of the present embodiment, for convenience, is predicated on differentiation of the settings of presence of any corrections and the settings of the correction amounts. However, sometimes the two will not be differentiated. When in the explanation of the present embodiment it is said that correction is not carried out or the correction amount is 0, in both cases, in the computer or the like, processing which is different from the processing in the case where correction is carried out may be carried out or the same processing as the processing in the case where correction is carried out but where the value of the variable corresponding to the correction amount is made 0 may be carried out.

As the settings relating to correction in units of the main areas 101, as a typical example, there can be mentioned a mode of designating settings relating to the mutually same corrections for the plurality of ejection elements 11 included in each main area 101. For example, there can be mentioned a mode of setting no correction for all ejection elements 11 included in one main area 101 or setting the same correction amount for all ejection elements included in one main area 101.

However, even in a mode where settings relating to corrections are different from each other among the plurality of ejection elements 11 in a main area 101, sometimes settings relating to corrections may be grasped as having been designated in the unit of the main area 101. As such a mode, for example, there can be mentioned a mode of setting for a main area 101 a ratio between the ejection elements 11 to be corrected and the ejection elements 11 not to be corrected in the plurality of ejection elements 11 in the main area 101 and assigning presence of any corrections to the plurality of ejection elements 11 based on this ratio. The ratio explained above is not a parameter able to be individually set for the plurality of ejection elements 11, therefore setting a ratio may be said to be designating settings relating to corrections in units of the main areas 101. Further, from another viewpoint, setting a ratio is not setting presence of any corrections for the plurality of ejection elements 11 in accordance with the individual characteristics of the plurality of ejection elements 11, therefore it may be said to be designating settings relating to corrections in units of the main areas 101. The same is true for the settings relating to corrections in units of sub-areas 103 which will be explained later.

Figure 5A:
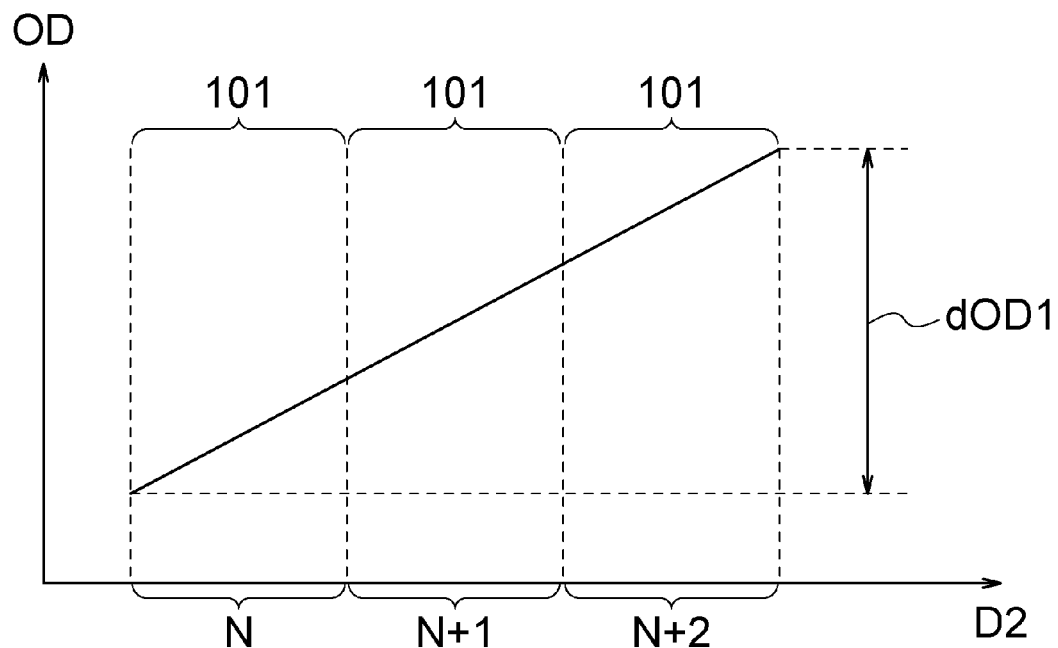
FIG. 5A and FIG. 5B are graphs explaining a correction method according to a comparative example.
Figure 5B:
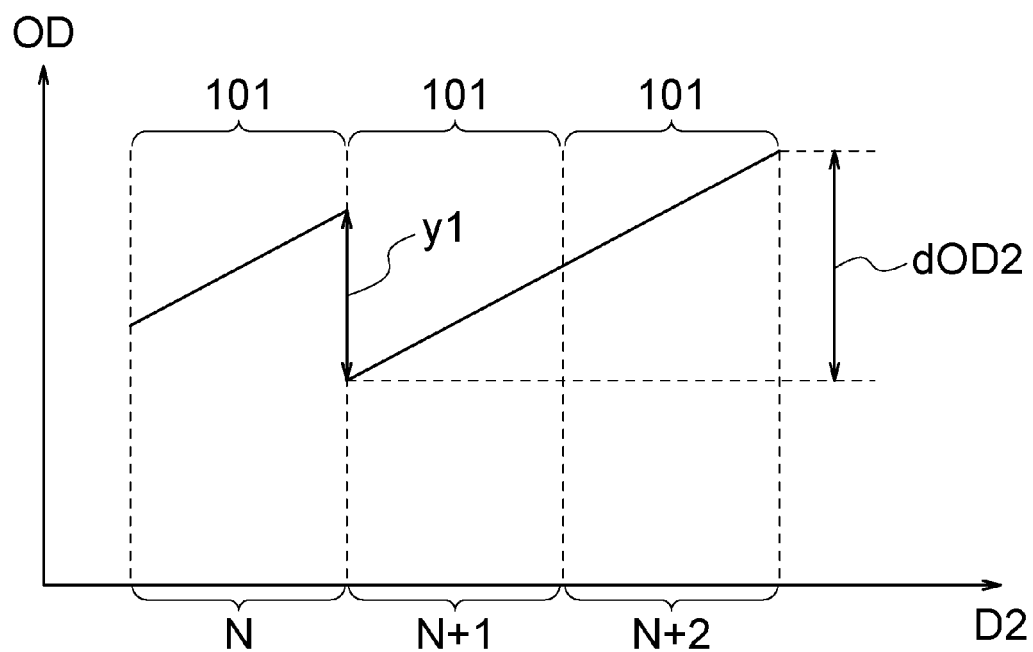

FIG. 5A and FIG. 5B are graphs explaining the difference of darkness which occurs in a case of designating settings relating to corrections in units of the main areas 101. In these graphs, the abscissas show the positions in the D2 (D5) direction. In the example shown, on the abscissa, a range of successively arranged N-th, N+1-th, and N+2-th (N is an integer of 1 or more) main areas 101 is plotted. The ordinates show density values. The density values are for example OD (optical density) values.

Assume that when intending to form an image having mutually the same density values in the three successively arranged main areas 101, as shown in FIG. 5A, unintended darkness occurs where the density value becomes higher the more to one side in the D2 direction. Further, assume that a difference between the minimum value and the maximum value of the density values in this case is dOD1.

In such a case, assume that as shown in FIG. 5B, the density value is corrected so as to raise the density value in the N-th main area 101 having the lowest density value. Due to this, the difference dOD2 between the minimum value and the maximum value of the density values becomes smaller than the difference dOD1 of density values in FIG. 5A. That is, the unintended darkness is reduced.

On the other hand, however, as indicated by an arrow y1, at the boundary between the corrected N-th main area 101 and the uncorrected N+1-th main area 101, a sudden change of the density value arises. As a result, this boundary is visually recognized as a stripe, so conversely the possibility arises of lowering the image quality.

In FIG. 5B, the explanation was given by taking as an example the boundary between the corrected N-th main area 101 and the uncorrected N+1-th main area 101. However, even at boundaries among the main areas 101 which are all corrected and have mutually different correction amounts, in the same way, unintended differences of darkness occur. That is, unintended differences of darkness may occur between mutually adjoining main areas 101 when the two are mutually different in the settings relating to corrections.

Note that, in the explanation of the present embodiment, basically, the mode where the settings relating to corrections designated in units of the main areas 101 are only the settings of presence of any corrections and the correction amounts are not set in units of the main areas 101 is taken as an example.

Further, in FIG. 5B, a main area 101 having a relatively low density value was made higher in density value. Conversely to this, a main area 101 having a relatively high density value may be corrected lower the density value as well. In the explanation of the present embodiment, basically the former will be explained as an example. For the latter, the explanation of the present embodiment may be employed by reading the high and low values reversely, so the explanation will be omitted.

Figure 6:
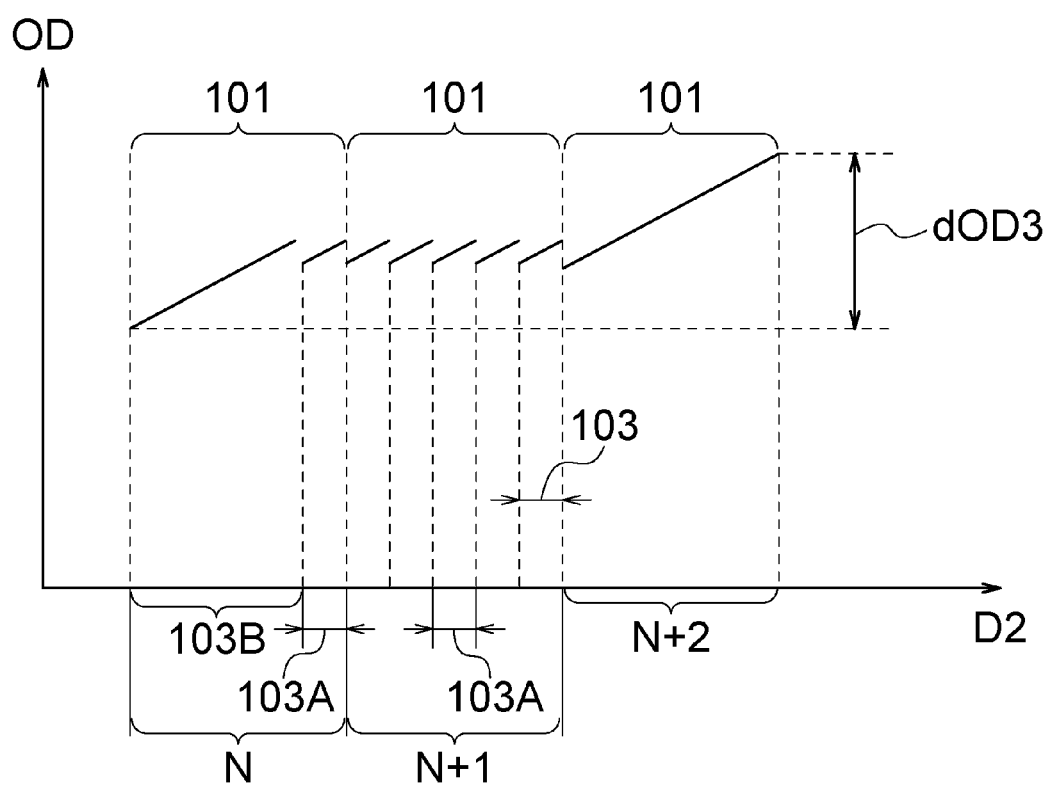
FIG. 6 is a graph explaining a correction method according to the embodiment.

FIG. 6 is a view similar to FIG. 5A and FIG. 5B for explaining a method of reducing differences of darkness at the boundaries among the main areas 101 explained above.

As shown in this figure, in the present embodiment, at least one (two in the example shown) of the main areas 101 which are different from each other in settings relating to corrections and adjoin each other is divided into a plurality of sub-areas 103 (103A and 103B). Further, maintaining or redesignating the settings relating to corrections designated for the main area 101 is carried out in units of the sub-areas 103. As the settings relating to corrections in units of the sub-areas 103, in the same way as the settings relating to corrections in units of the main areas 101, in addition to the mode of designating the same settings of corrections for the ejection elements 11 in each sub-area 103, there can be mentioned the mode of setting parameters which cannot be individually set for the ejection elements 11 and/or the mode of designating settings of corrections without individually considering the characteristics of the ejection elements 11.

Further, the maintaining or redesignating the settings relating to corrections in units of the sub-areas 103 is carried out so that the correction amounts of darkness of two main areas 101 which adjoin each other become closer to each other near the boundary of the two. Due to this, the difference of darkness at the boundary of mutually adjoining main areas 101 is reduced, therefore the probability that the difference of darkness will be visually perceived as a stripe can be lowered. Further, since the settings relating to corrections are designated in units of the sub-areas 103, an increase of the processing load and increase of the amount of the memory used are suppressed.

In more detail, in the example shown, the N+1-th main area 101 was set for no correction (FIG. 5B). Contrary to this, in FIG. 6, in the N+1-th main area 101, the sub-area 103 adjacent to the N-th main area 101 is redesignated in settings relating to corrections so that its correction amount becomes a value between the correction amount of the original settings (zero) and the correction amount of the N-th main area 101 (not limited to exactly the middle, the same is true for the following explanation). In more detail, all sub-areas 103 in the N+1-th main area 101 are redesignated in settings relating to corrections so that the correction amounts become closer to the correction amount of the N-th main area 101 the closer the sub-area 103 to the N-th main area 101.

Further, in the example shown, the N-th main area 101 was set so that the correction was to be carried out (FIG. 5B). Further, in FIG. 6, the sub-area 103A in the N-th main area 101 which adjoins the N+1 main area 101 is redesignated in settings so that its correction amount becomes an amount between the correction amount of the original settings and the correction amount of the N+1-th main area (in more detail, the correction amount after the redesignation in the sub-area 103 adjoining the N-th main area 101). On the other hand, the remaining sub-area 103B is maintained in the original settings relating to corrections.

In the example shown, the settings relating to corrections are redesignated so that the density value of the N+1-th main area 101 which generated the minimum value of the density value in FIG. 5B becomes larger. As a result, the secondary effect arises that a difference dOD3 between the minimum value and the maximum value of the density values in FIG. 6 becomes smaller than the difference dOD2 in FIG. 5B.

(Example of Patterns of Settings Relating to Corrections of Sub-Areas)

Figure 7:
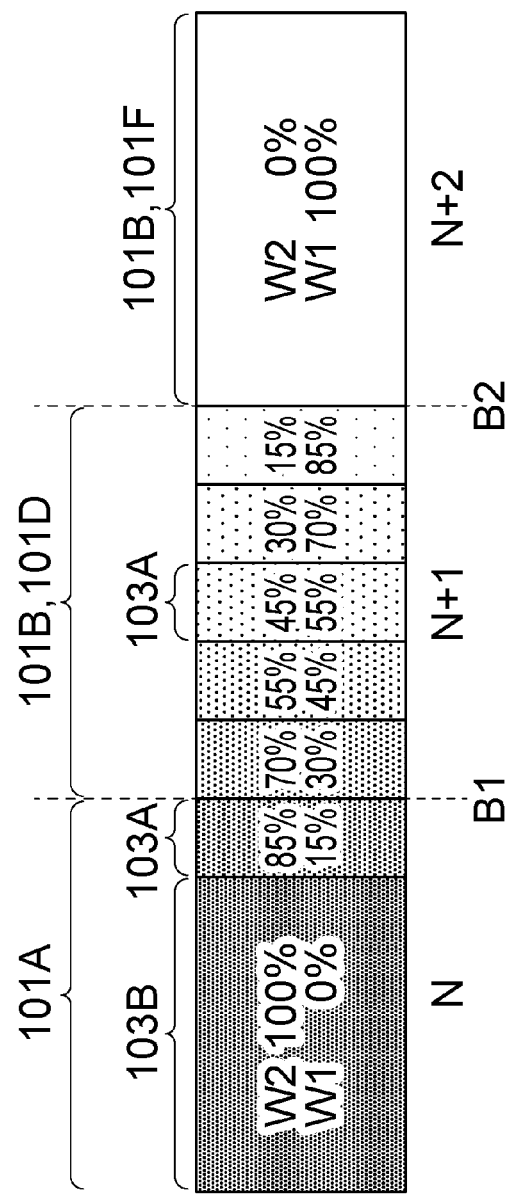
FIG. 7 is a schematic view showing an example of a pattern of settings relating to correction in the correction method in FIG. 6.
Figure 8:
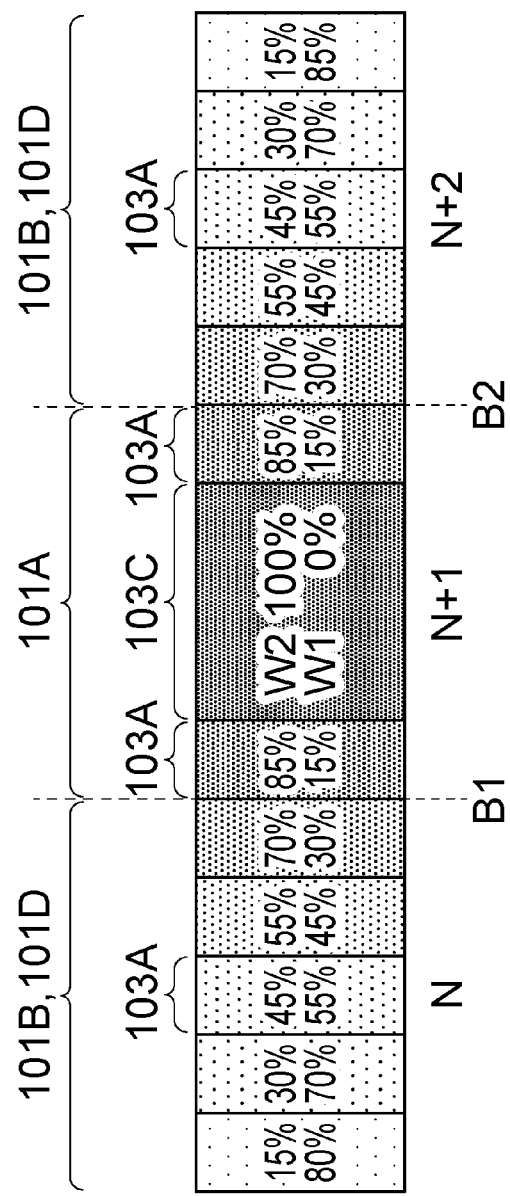
FIG. 8 is a schematic view showing another example of a pattern of settings relating to correction.
Figure 9:
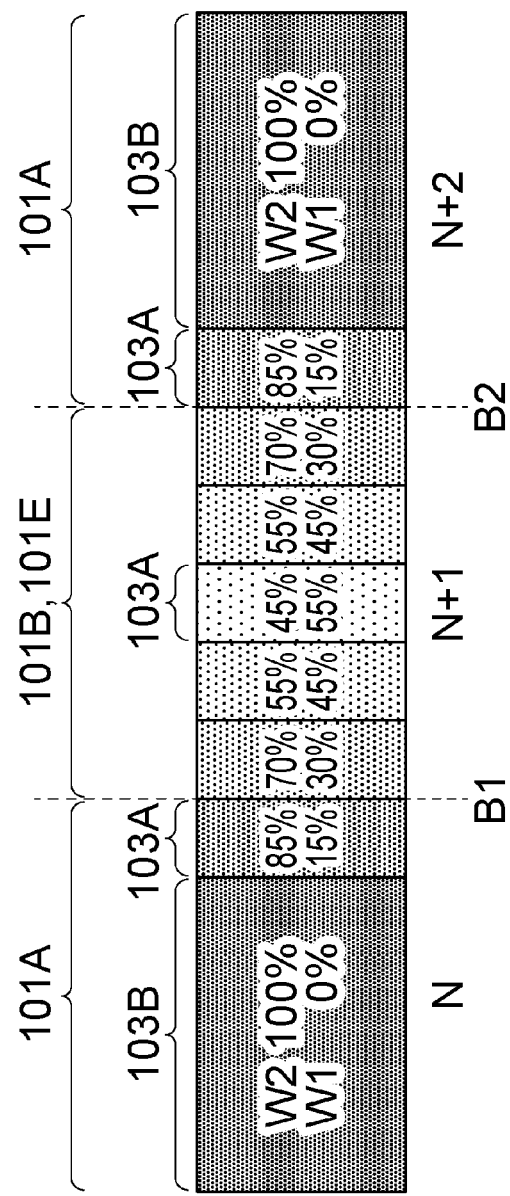
FIG. 9 is a schematic view showing still another example of a pattern of settings relating to correction.

FIG. 7 to FIG. 9 are schematic views showing examples of patterns of settings relating to corrections of the sub-areas. These views show the three N-th to N+2-th main areas 101. Hatchings attached to the main areas 101 or sub-areas 103 show settings relating to corrections. Specifically, no hatching shows no correction while denser hatchings show larger correction amounts.

The numerical values (%) in the figures will be explained in detail later, but here they should be understand as follows. Among the numerical values in the upper rows and lower rows, "0%" in the upper rows shows that correction is not carried out. "100%" in the upper rows shows the correction amounts (not zero) which are set first for the main areas 101. Note that, as already explained, in the present embodiment, these correction amounts are the same as each other among the plurality of main areas 101 for which settings of carrying out corrections were designated. The numerical values in the upper rows which exceed 0% and are less than 100% show the ratios of the correction amounts in settings which are redesignated for the sub-areas 103 relative to the above 100% of correction amount. The numerical values in the lower rows are values obtained by subtracting the numerical values in the upper rows from 100%.

In the following explanation, sometimes the settings relating to corrections first designated in units of main areas 101 will be referred to as the "initial settings". The main areas 101 which are set so be corrected in the initial settings will be sometimes referred to as the "correction areas 101A". The main areas 101 which are set so as not to be corrected in the initial settings will be sometimes referred to as the "non-correction areas 101B".

The example in FIG. 7 corresponds to the example shown in FIG. 6. In this example, in the initial settings, the N-th main area 101 is a correction area 101A, and the N+1-th and N+2-th main areas 101 are non-correction areas 101B. Although not particularly shown, on the left side of the N-th main area 101 on the page, there is no main area 101 or there is a correction area 101A. Further, on the right side of the N+2-th main area 101 on the page, there is no main area 101 or there is a non-correction area 101B.

In the above initial settings, a difference of darkness is easily caused at a boundary B1. Therefore, in the N+1-th main area 101, all sub-areas 103 are redesignated in settings relating to corrections so that the correction amount becomes larger (becomes closer to the correction amount of the N-th main area 101) the closer a sub-area 103 to the N-th main area 101.

Further, in the N-th main area 101 as well, the sub-areas 103A adjoining the N+1-th main area 101 are redesignated in settings relating to corrections so that the correction amounts become smaller (become closer to the correction amount of the N+1-th main area 101). In the remaining sub-area 103B in the N-th main area 101 and in the N+2-th main area 101, the initial settings are maintained.

Although not particularly shown, a correction area 101A may also be maintained in initial settings without being redesignated in settings relating to corrections for the sub-areas 103. Further, in a non-correction area 101B (N+1) for which the settings relating to corrections are redesignated, the part of the sub-areas 103 on the other non-correction area 101B (N+2) side may be maintained in the initial settings (no corrections) without redesignation of the settings relating to corrections. The same is true for the other examples of patterns which will be explained later.

Further, examples of patterns inverted left and right from FIG. 7 may also be generated. In the processing executed by the computer, the left and right inverted patterns may be handled as different patterns as well.

In the example in FIG. 8, in the initial settings, the N-th and N+2-th main areas 101 are non-correction areas 101B and the N+1-th main area 101 between the two is a correction area 101A. Although not particularly shown, on the left side of the N-th main area 101 on the page, there is no main area 101 or there is a non-correction area 101B. Further, on the right side of the N+2-th main area 101 on the page, there is no main area 101 or there is a non-correction area 101B.

In the initial setting explained above, differences of darkness easily occur at the boundaries B1 and B2. Therefore, in the N+2-th main area 101, in the same way as the N+1-th main area 101 in FIG. 7, the settings relating to corrections are redesignated. Further, in the N-th main area 101, the settings relating to corrections are redesignated by a pattern inverted left and right from the pattern of the N+1-th main area 101 in FIG. 7.

In the N+1-th main area 101, in the same way as the N-th main area 101 in FIG. 7, the sub-areas 103A adjoining the non-correction areas 101B (N-th and N+2-th main areas 101) are redesignated in settings relating to corrections so that the correction amounts become smaller (so as to approach the correction amounts of the non-correction areas 101B). However, unlike the N-th main area 101 in FIG. 7, the non-correction areas 101B adjoin the N+1-th main area 101 at the two sides, therefore the settings relating to corrections are redesignated in the sub-areas 103A at the two sides, and the initial settings are maintained in the sub-area 103C which remains at the center.

In the example in FIG. 9, in the initial settings, the N-th and N+2-th main areas 101 are correction areas 101A and the N+1-th main area 101 between the two is a non-correction area 101B. Although not particularly shown, on the left side of the N-th main area 101 on the page, there is no main area 101 or there is a correction area 101A. Further, on the right side of the N+2-th main area 101 on the page, there is no main area 101 or there is a correction area 101A.

In the initial settings explained above, differences of darkness easily occur at the boundaries B1 and B2. Therefore, in the N+1-th main area 101, all sub-areas 103 are redesignated in settings relating to corrections so that the correction amounts become larger (so as to approach the correction amounts of the N-th and N+2-th main areas 101) toward the two sides. Note that, although not particularly shown, in the N+1-th main area 101, the sub-area 103 at the center may be maintained in the initial settings without correction as well.

In the correction areas 101A (N-th and N+2-th main areas 101), in the same way as the N-th main area 101 in FIG. 7, the sub-areas 103A adjoining the non-correction area 101B (N+1-th main area 101) are redesignated in settings relating to corrections so that the correction amounts become smaller (so as to approach the correction amount of the N+1-th main area 101).

Note that, in the following explanations, among the non-correction areas 101B, an area like the N+1-th main area 101 in FIG. 7 for which the settings relating to corrections are redesignated so that the correction amounts of the sub-areas 103 gradually become larger from one side (the other non-correction area 101B side) toward the other side (the correction area 101A side) will be sometimes referred to as a "first diffusion area 101D". Further, a non-correction area 101B like the N+1-th main area 101 in FIG. 9 in which the correction amounts of the sub-areas 103 gradually become larger from the center side toward the two sides (sides of the correction areas 101A) will be sometimes referred to as a "second diffusion area 101E". Further, a non-correction area 101B like the N+2-th main area 101 in FIG. 7 for which the initial settings are maintained will be sometimes referred to as a "true non-correction area 101F".

In the examples of patterns in FIG. 7 to FIG. 9, in summary, in a non-correction area 101B adjoining a correction area 101A, all sub-areas 103 are redesignated in settings relating to corrections so that the correction amounts gradually become larger the closer to the correction area 101A. Further, this non-correction area 101B is defined as a first diffusion area 101D when only one side adjoins a correction area 101A and is defined as a second diffusion area 101E when adjoining correction areas 101A at the two sides.

Further, in a correction area 101A adjoining a non-correction area 101B, one sub-area 103A adjoining the non-correction area 101B is redesignated in settings relating to corrections so that the correction amount becomes smaller. Further, in this correction area 101A, one sub-area 103A is redesignated in settings relating to corrections when only one side adjoins a non-correction area 101B, while two sub-areas 103A are redesignated in settings relating to corrections when two sides adjoin non-correction areas 101B. Further, the remaining sub-areas 103 (103B or 103C) are maintained in the initial settings.

Further, the main areas 101 other than those described above are maintained in the initial settings. The "main areas 101 other than those explained above" are specifically a correction area 101A adjoining correction areas 101A at its two sides (sometimes there is no main area 101 on one side) and a non-correction area 101B (true non-correction area 101F) adjoining non-correction areas 101B at its two sides (sometimes there is no main area 101 on one side).

Examples of patterns generated by the method of redesignation of settings relating to corrections explained above are generated in cases other than FIG. 7 to FIG. 9 as well. For example, a pattern where not first diffusion areas 101D, but second diffusion areas 101E are positioned on the two sides of the N+1-th main area 101 in FIG. 8 may be generated as well. However, these can be deduced from the explanations up to here, therefore illustration is omitted.

(Main Areas)

The main areas 101 may be suitably set with respect to the facing surface 2a of the head 2 (in more detail, the region where the nozzles 3 are arranged). For example, the direction dividing the facing surface 2a into a plurality of main areas 101 may be the D2 direction as shown in FIG. 2 (the direction perpendicular to the direction in which the recording medium and the head relatively move) or may be another direction (for example the D5 direction, D1 direction, or D4 direction) unlike FIG. 2. Further, the facing surface 2a may be divided into a plurality of areas in the both of the D5 direction and D4 direction or otherwise divided two-dimensionally. Further, it is also possible to form the boundaries of the main areas 101 in intertwined shapes.

Further, for example, the sizes of the main areas 101 (from another viewpoint, the number of areas the facing surface 2a of the head 2 is divided into) may be suitably set as well. For example, the sizes of the plurality of main areas 101 (dimensions or numbers of the nozzles 3) may be the same as each other or may be different from each other. In the example in FIG. 2, among the plurality of main areas 101, the main areas 101 other than the main areas 101 at the two ends are given mutually the same sizes. The main areas 101 at the two ends are made smaller than the other main areas 101. The end parts are parts which easily become abnormal regions concerning the ejection characteristics of the nozzles 3 and the like. Therefore, if the main areas 101 in the end parts are made smaller, it becomes easier to adjust the densities by a high precision. However, all main areas 101 may have mutually the same sizes as well.

The specific sizes of the main areas 101 may also be suitably set. For example, if the number of the nozzles 3 included in a main area 101 is large, the effects (lightening of the processing load and the like) due to designation of the settings relating to corrections in units of the main areas 101 are improved. On the other hand, if the number of the nozzles 3 included in a main area 101 is small, for example, the accuracy of the correction is improved. Accordingly, the sizes of the main areas 101 may be suitably set by comparing and considering the two. When explaining one example, the number of the nozzles 3 included in one main area 101 or the number of the positions DP in FIG. 3 is 100 to 500. Further, when explaining one example from another viewpoint, the number of the plurality of main areas 101 (number of areas the facing surface 2a of the head 2 is divided into) is 10 to 40.

Note that, as understood from the explanation of the ejection elements 11 given with reference to FIG. 4, for example, the arrangement of the nozzles 3 and the arrangement of the pressurization elements 37 (pressurizing chambers 23) do not always coincide. Accordingly, for example, in the vicinity of the boundary of two main areas 101, in one ejection element 11, sometimes the nozzle 3 will be positioned in one main area 101 and the pressurization element 37 will overlap another main area 101 in a plane perspective. In such a case, any position may be used as the reference for determining to which main area 101 the ejection element 11 belongs. From another viewpoint, the main areas 101 may be set by using the nozzles 3 as the standard or may be set by using the pressurization elements 37 as the standard. The main areas 101 are set so as to include relatively many ejection elements 11, so no matter what position in an ejection element 11 is used as the standard, the influence of the difference of the position used as the standard exerted upon the darkness is limited. However, in the explanation of the present embodiment, for convenience, sometimes the relationships between the ejection elements 11 and the main areas 101 will be explained using the nozzles 3 as the standard. The same is true for the sub-areas 103 which will be explained later.

(Sub-Areas)

The sub-areas 103 may be suitably set with respect to the main areas 101. The direction in which a main area 101 is divided into a plurality of sub-areas 103 (direction of arrangement of the sub-areas 103) is basically the same direction as the direction in which the facing surface 2a of the head 2 is divided into a plurality of main areas 101 (direction of arrangement of the main areas 101). From another viewpoint the direction of dividing a main area 101 into a plurality of sub-areas 103 is the direction intersecting (for example perpendicular to) the boundaries between the main areas 101. However, for example, in addition to such a direction, the main area 101 may be divided into a plurality of areas even in the direction intersecting (for example perpendicular to) the former direction to thereby configure the sub-areas 103.

Further, for example, the sizes of the sub-areas 103 (from another viewpoint, the number of sub-areas a main area 101 is divided into) may be suitably set. For example, the sizes of the plurality of sub-areas 103 (dimensions or number of nozzles 3) may be mutually the same or may be mutually different.

In the examples in FIG. 7 to FIG. 9, the non-correction areas 101B (first diffusion area 101D and second diffusion area 101E) adjoining a correction area 101A are divided into pluralities of sub-areas 103A having mutually the same sizes. The numbers (sizes) of these sub-areas 103A are for example the same between the first diffusion area 101D and the second diffusion area 101E. The numbers of the sub-areas 103 in these diffusion areas are for example three or more and are made five in the example shown. However, they may be made two, four, or six or more as well.

Further, in the examples in FIG. 7 and FIG. 9, a correction area 101A (for example the "N-th" in FIG. 7) adjoining a non-correction area 101B (diffusion area) only at one side is divided into sub-areas 103A and 103B which are different in sizes from each other. From another viewpoint, this correction area 101A is divided with a number of sub-areas (here, two) which is smaller than the number of areas the diffusion areas 101 (101D and 101E) are divided into. The sub-area 103A adjoining the non-correction area 101B is for example made smaller than the sub-area 103B on the opposite side to this. In more detail, for example, the size of the above sub-area 103A is the same as the size of the sub-area 103A which is obtained by equally dividing the diffusion areas (101D and 101E).

Further, in the example in FIG. 8, a correction area 101A (N+1-th) adjoining non-correction areas 101B (diffusion areas) at its two sides is divided into the sub-areas 103A and 103C having mutually different sizes. From another viewpoint, this correction area 101A is divided into a number of sub-areas (here, three) which is smaller than the numbers of sub-areas the diffusion areas (101D and 101E) are divided into. The sub-areas 103A which adjoin the non-correction areas 101B are for example made smaller than the sub-area 103C at the center side. In more detail, for example, the sizes of these sub-areas 103A are the same as the sizes of the sub-areas 103A which are obtained by equally dividing the diffusion areas (101D and 101E).

Note that, conceptually, the sub-areas 103A, 103B, and 103C are sub-areas 103 which are different in sizes from each other. However, in the processing of the computer, for example, the sub-areas 103B and 103C may be handled as sets of two or more sub-areas 103A as well.

(Correction Method in Initial Settings)

The correction method designated in the initial settings for a correction area 101A for raising the density value may be made a suitable one. For example, the correction method may be selected from among the methods which have been already explained as the methods for realizing the intended darkness. That is, the diameters of the dots on the recording medium may be made larger or the number of dots per constant area may be made larger. The method of making the dot diameters larger may be one making one liquid droplet larger, may be one making the number of liquid droplets deposited upon one spot larger, or may be one combining these.

Further, from another viewpoint, the correction method may be one making the liquid droplets ejected from the nozzles 3 larger by making the potential difference between the high potential $V_H$ and the low potential $V_L$ of the driving signal Sg larger or the like or may be one increasing the number of the liquid droplets by making the number of waves included in the driving signal Sg1 corresponding to one ejection request larger, may be realized by change of the number per constant area of the ejection elements 11 performing the ejection operation, or may be one combining these.

Further, the method of realizing the intended darkness and the correction method of darkness may be different from each other or may be the same as each other. For example, when explaining one example of mutually different methods, the method of changing the number of the waves included in the driving signal Sg1 corresponding to one ejection request and/or the method of changing the number of the ejection elements 11 performing the ejection operation per constant area may be employed as the method for realizing the intended darkness, while the method of making the potential difference of the driving signal Sg1 larger may be employed as the correction method. In the explanation of the present embodiment, such a mode will be taken as an example.

Figure 10B:
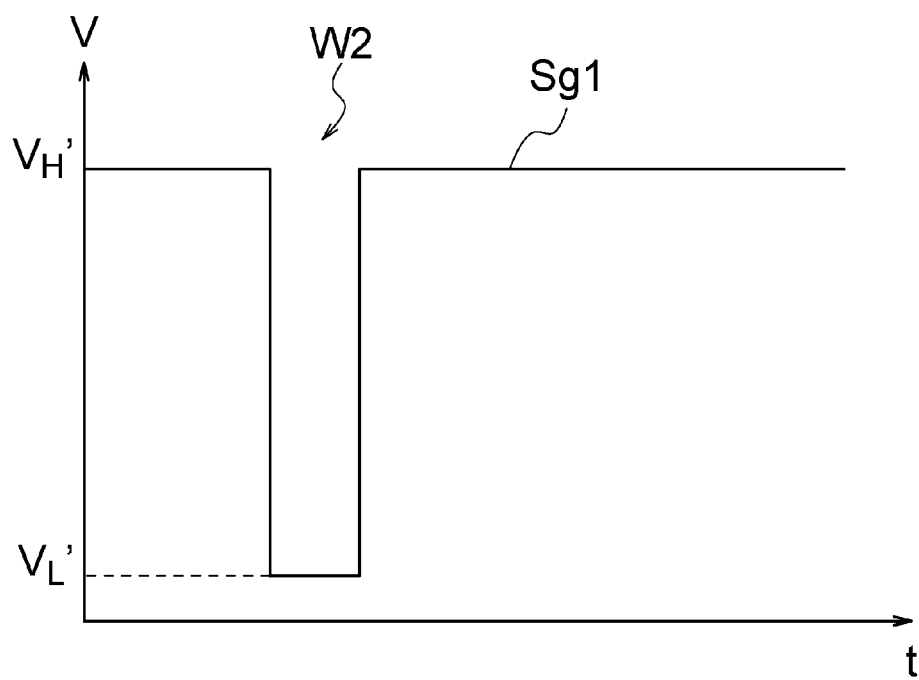

FIG. 10A and FIG. 10B are schematic views for explaining the correction method designated in the initial settings for the correction area 101A for raising the density value in the present embodiment. FIG. 10A is as already explained, and FIG. 10B is a view similar to FIG. 10A. Here, assume that FIG. 10A shows a waveform W1 before the correction of the driving signal Sg1. Assume that FIG. 10B shows a waveform W2 after correction of the driving signal Sg1.

The potential difference between the high potential $V_{H'}$ and the low potential $V_{L'}$ in the waveform W2 after the correction becomes larger compared with the potential difference between the high potential $V_H$ and the low potential $V_L$ in the waveform W1 before the correction. Accordingly, by inputting the driving signal Sg1 having the waveform W2 after the correction to an ejection element 11 in place of the driving signal Sg1 having the waveform W1 before the correction, the liquid droplets can be made larger, therefore the density can be made higher (corrected). In other words, by using the waveform W1 for a non-correction area 101B (true non-correction area 101F) and using the waveform W2 for a correction area 101A, the density value of the correction area 101A increases (is corrected) relative to the density value of the non-correction area 101B. Further, by adjusting the degree of increase of the potential difference, the correction amount can be adjusted. Note that, at the time of increasing the potential difference, any of the high potential $V_H$ and the low potential $V_L$ may be adjusted or both may be adjusted.

The correction amount in the initial settings may be suitably set. For example, a predetermined test image is printed on the recording medium by the printer 1. The waveform of the driving signal Sg1 utilized at this time is for example only the waveform W1 before the correction. Further, a main area 101 to be made a correction area 101A and its correction amount may be determined based on the unintended variation of density values in this image. The relationships between the unintended variation of density values and the judgment criteria for determining which main area 101 is to be made a correction area 101A and the relationships between the variation of darkness and the correction amount may be suitably set.

Further, in the above, the information of density values in the test image may be for example acquired for each dot (for every ejection element 11) or may be acquired for each region in which a plurality of dots are formed. In judgment for designating a correction area 101A from among a plurality of main areas 101, use may be made of suitable information of density values of each main area 101. For example, use may be made of a mean value, median value, most frequent value, maximum value, and/or minimum value. In the setting of the correction amount, various statistical values relating to the density values in each main area 101 as explained before may be used for the plurality of main areas 101. Otherwise, use may be also made of the information of the density values of all ejection elements 11 (for example standard deviations of all ejection elements 11) regardless of which main area 101 they belong to.

(Correction Method in Re-Setting)

The correction method in settings which are redesignated for sub-areas 103 in a non-correction area 101B or correction area 101A also may be made a suitable one. This correction, in the same way as the correction method in the initial settings, may be selected from among various methods which have been already explained as the method for realizing the intended darkness.

Further, in the re-setting, a correction which is carried out with a smaller correction amount relative to the correction amount in the initial settings may be for example a correction making the value of a parameter made to increase in the correction in the initial settings smaller than the initial settings or may be a correction making the value of a parameter different from the parameter made to increase in the correction in the initial settings smaller. As one example of the former, there can be mentioned a method of increasing the potential difference of the driving signal by a correction amount in accordance with the unintended darkness in the correction in the initial settings while increasing the potential difference by a correction amount smaller than the above correction amount in the correction in the re-setting. Further, as one example of the latter, there can be mentioned a method of increasing the potential differences of the driving signals of a predetermined number of ejection elements 11 by a correction amount in accordance with the unintended darkness in the correction in the initial setting while increasing the potential differences of the driving signals of a smaller number of the ejection elements 11 than the above predetermined number by the above correction amount in the correction in the re-setting.

In the present embodiment, mainly one example of the latter described above will be explained. For example, as already explained, the initial settings are settings where the driving signal Sg1 having the waveform W1 before the correction shown in FIG. 10A is input to all ejection elements 11 in a non-correction area 101B, while the driving signal Sg1 having the waveform W2 after the correction shown in FIG. 10B is input to all ejection elements 11 in a correction area 101A. Contrary to this, in a sub-area 103A for which the correction amount of darkness is redesignated, a ratio of the ejection elements 11 receiving as input the driving signal Sg1 having the waveform W2 to all ejection elements 11 in the sub-area 103 is suitably set within a range of more than 0%, but less than 100%.

In FIG. 7 to FIG. 9, the ratios (%) in the upper rows show the ratios of the ejection elements 11 receiving as input the driving signals Sg1 having the waveforms W2 after the correction. The ratios (%) in the lower rows show the ratios of the ejection elements 11 receiving as input the driving signals Sg1 having the waveforms W1 before the correction.

Accordingly, in all or part of a correction area 101A for which the initial settings are maintained (for example the sub-area 103B in the N-th main area 101 in FIG. 7), the ratio shown in the upper row is 100%, and the ratio shown in the lower row is 0%. Further, in a non-correction area 101B for which the initial settings are maintained (for example the true non-correction area 101F in FIG. 7, also a portion of the non-correction area 101B is possible unlike the present embodiment), the ratio shown in the upper row is 0%, and the ratio shown in the lower row is 100%.

The changes of the ratios explained above in the plurality of sub-areas 103A may be suitably set. In the example shown, a case where the ratio changes with a substantially constant rate of change (10% to 15%) relative to the positions of the plurality of sub-areas 103A is illustrated. Specifically, in the example shown, in the first diffusion area 101D and the correction area 101A adjoining this, the ratio of input of the driving signal Sg1 having the waveform W2 after the correction is made 15%, 30%, 45%, 55%, 70%, and 85% in order from the true non-correction area 101F side to the sub-area 103B (or 103C) side in the correction area 101A for which the initial settings are maintained. In the second diffusion area 101E and the correction areas 101A adjoining this, the ratio of input of the driving signal Sg1 having the waveform W2 after the correction is made 45%, 55%, 70%, and 85% in order from the center side to the two sides.

The ratio of the ejection elements 11 receiving as input the driving signal Sg1 having the waveform W2 after the correction in each sub-area 103 and/or the difference of the ratios between mutually adjoining sub-areas 103 may be for example set in advance by a manufacturer of the printer 1, may be able to be set by the printer 1 according to a predetermined algorithm, and/or may be able to be set by the user of the printer 1. From another viewpoint, the above ratio and/or difference of the ratios may be fixed or may be variable.

(Configuration of Control System)

FIG. 11 is a block diagram schematically showing a hardware configuration according to a control system of the printer 1.

The printer 1 has a head 2, a scanner 121, and a control part 123 controlling them. Note that, the scanner 121 may be grasped as an external apparatus of the printer 1 as well.

The head 2 is as already explained with reference to FIG. 1 etc. However, here, the body portion of the head 2 minus a not shown driving IC for inputting the driving signal to the actuator 15 is treated as the head 2.

The scanner 121 for example reads an image printed on the recording medium (for example printing paper P) by the printer 1 and generates image data. Due to this, the control part 123 can acquire information relating to the darkness of the image printed by the printer 1. Based on the acquired information relating to the darkness, the control part 123, for example, determines the judgment standard for designating a correction area 101A from among the plurality of main areas 101 and/or the correction amount in the initial settings.

The control part 123, here, is a concept including not only the control device 88 explained with reference to FIG. 1, but also a not shown driving IC for inputting the driving signal to the actuator 15. The roles of the control device 88 and driving IC may be suitably set, therefore they are conceptually considered inclusively in this way.

The control part 123, for example, has a CPU (central processing unit) 125, ROM (read only memory) 127, RAM (random access memory) 129, and external storage device 131. They may be grasped as the computer 124. The CPU 125 runs the program stored in the ROM and/or external storage device 131 whereby the various types of functional parts which will be explained later are constructed. In FIG. 11, as the program, a program 133 stored in the external storage device 133 is illustrated.

The program 133, for example, among the programs which are needed by the control part 123, may include only parts relating to the correction of darkness in the present embodiment or may include parts relating to the fundamental operation of the printer 1 in addition to the parts relating to the correction. Further, the program 133 may be stored in the external storage device 131 from an initial stage (stage of distribution of the hardware of the printer 1) or may be one stored by the user in the external storage device 131 after sale of the printer 1.

Figure 12:
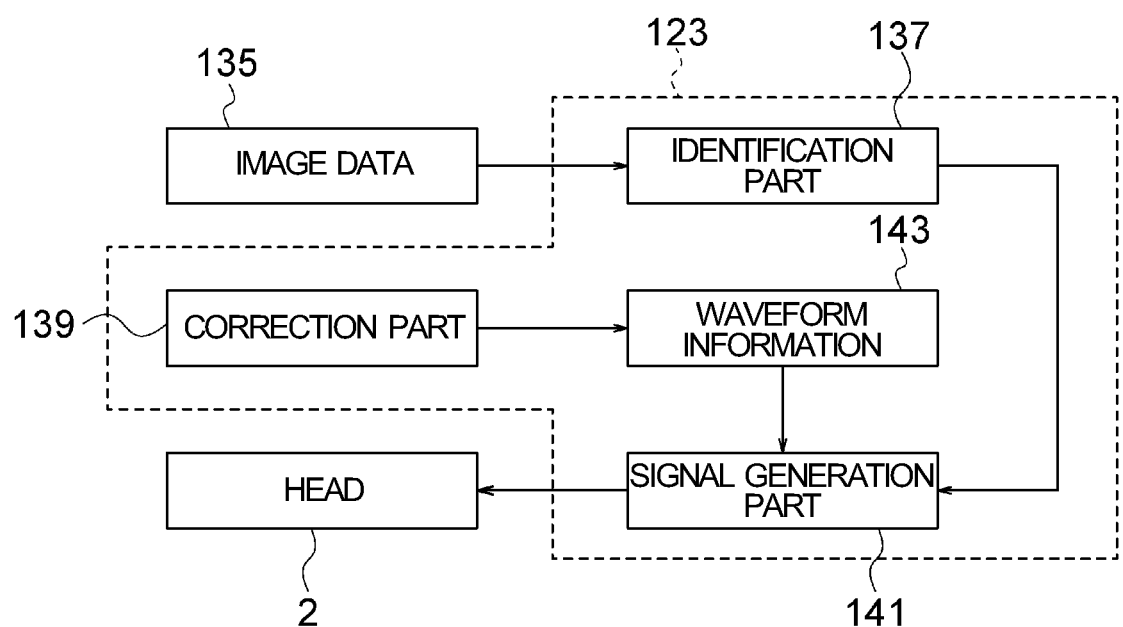
FIG. 12 is a functional block diagram relating to the control system in the recording apparatus in FIG. 1.

FIG. 12 is a functional block diagram relating to the control system of the printer 1.

As explained above, in the control part 123, various types of functional parts are constructed by the CPU 125 running the program. Here, as the various types of functional parts, an identification part 137, correction part 139, and signal generation part 141 are shown.

The image data 135 is data (printing data) of an image (including one consisting of texts) to be printed by the printer 1. Based on the image data 135, the identification part 137 determines various parameters relating to the driving signals Sg1 input to the ejection elements 11 linked with timing synchronized with the conveyance speed of the recording medium (printing paper P). For example, for ejection elements 11 forming dots in a region where the density becomes relatively high in the image, the number of waves included in the driving signal Sg1 according to one ejection request is set relatively large or the ratio of the ejection elements 11 ejecting the liquid droplets in the predetermined number of ejection elements 11 corresponding to the region is set relatively high. Due to this, the intended darkness based on the image data 135 is realized.

The correction part 139 performs the correction of darkness explained hitherto. Specifically, in the present embodiment, the waveform information 143 prescribing the waveform of the driving signal Sg1 is corrected (updated). The waveform information 143 is a portion of the signal information prescribing the driving signal Sg1. The waveform information 143 for example includes the values of various parameters (values such as high potential $V_H$ and low potential $V_L$) prescribing the waveform W1 before correction and the waveform W2 after correction and information identifying which of the waveforms W1 and W2 is to be utilized. Further, the waveform information 143 may include information of the ratio of the ejection elements 11 for which the waveform W2 is to be utilized in each sub-area 103 and/or the difference of the ratios between the sub-areas 103 which adjoin each other.

Note that, in the example explained in the present embodiment, the identification part 137 realizes the intended darkness by adjustment of the number of waves included in the driving signal Sg1 and/or density of the dots, while the correction part 139 performs the correction by changing the waveform W1 included in the driving signal Sg1 to the correction-use waveform W2. Accordingly, the values of the parameters determined by the identification part 137 are not changed by the correction part 139. In other words, a route from the image data 135 to the signal generation part 141 and a route from the correction part 139 to the signal generation part 141 become different. However, as already explained, the values of the parameters determined in the identification part 137 may be changed by the correction part 139 as well. Further, in the example explained in the present embodiment, the identification part 137 may determine a specific waveform W1 from two or more types of waveforms W1, and the waveform W2 after the correction may be one set based on that specific waveform W1.

The signal generation part 141 generates the driving signal Sg1 based on the values of the parameters set in the identification part 137 and the waveform information 143 (that is, signal information prescribing the driving signal Sg1) and outputs the result to the head 2.

Figure 13:
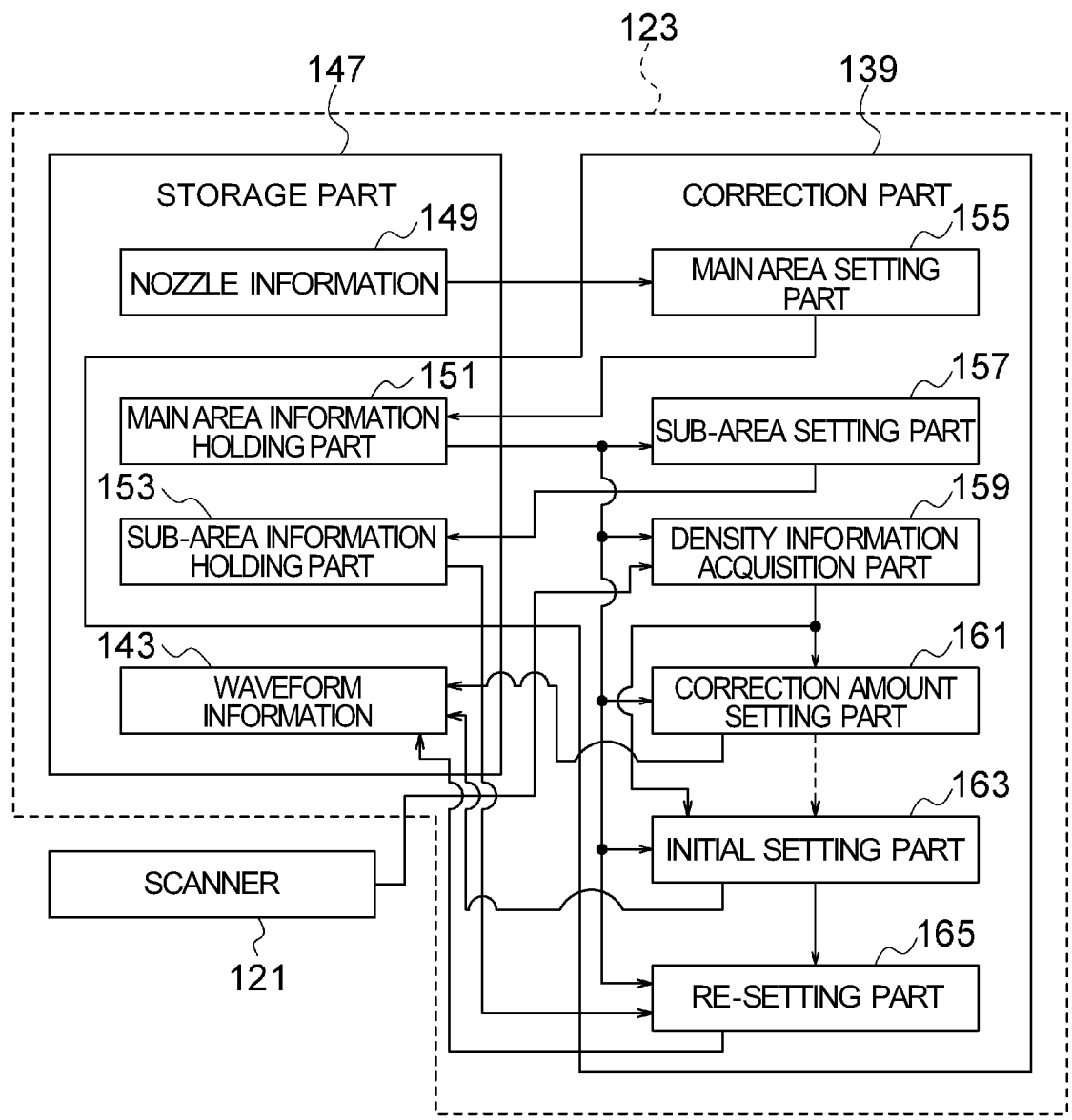
FIG. 13 is a functional block diagram showing details of a portion in FIG. 12.

FIG. 13 is a functional block diagram showing details of the parts relating to the correction part 139 among the various functional parts in the control part 123.

The control part 123 has a storage part 147. The storage part 147, for example, may be realized by any or all of the ROM 127, RAM 129, and external storage device 131. As indicated by the dotted lines, portions of the storage part 147 (main area information holding part 151 and sub-area information holding part 153) may be grasped as portions of the correction part 139.

The storage part 147 holds nozzle information 149 which is input in advance by the manufacturer of the printer 1 etc. The nozzle information 149 for example includes information identifying the positions of the plurality of nozzles 3 on the facing surface 2a.

The main area setting part 155 in the correction part 139 generates the main area information prescribing the plurality of main areas 101 based on the nozzle information 149 and makes the main area information holding part 151 in the storage part 147 store the same.

The main area information for example includes relative position relationships (for example order of arrangement) of the plurality of main areas 101 and information identifying the ejection elements 11 belonging to each main area 101. Note that, the main areas 101 are conceptually regions obtained by dividing the facing surface 2a of the head 2 into a plurality of areas in a predetermined direction. However, information that directly embodies this concept is not necessarily required. For example, the main area information need not include information of coordinates of the boundaries between the main areas 101 on the facing surface 2a.

In the above description, the main area setting part 155 generated the main area information based on the nozzle information 149. However, the main area information may be included in the program 133 from the start as well. That is, the main area setting part 155 need not be provided either.

The sub-area setting part 157 in the correction part 139 generates sub-area information prescribing the plurality of sub-areas 103 based on the main area information held by the main area information holding part 151 and makes the sub-area information holding part 153 in the storage part 147 store the same. The sub-area setting part 157 may generate the sub-area information for all main areas 101 or may generate the sub-area information only for the main areas 101 which were determined by a functional part which will be explained later to need redesignation of settings relating to corrections in units of sub-areas 103.

The sub-area information for example includes relative positional relationships (for example order of arrangement) of the plurality of sub-areas 103 in each main area 101 and information identifying the ejection elements 11 belonging to each sub-area 103. Note that, in the same way as the main area information, the sub-area information need not include information that directly embodies the concept of the sub-areas 103 (for example coordinates of the boundaries of the sub-areas 103).

In the above, the sub-area setting part 157 generated the sub-area information based on the main area information. However, for example, in a case where the main area information is included in the program 133 from the start and the sub-area information is generated for all main areas 101, the sub-area information may be included in the program 133 from the start as well. That is, the sub-area setting part 157 need not be provided either.

The density information acquisition part 159 in the correction part 139 acquires and processes information relating to error according to the density values of the plurality of ejection elements 11. Specifically, for example, the density information acquisition part 159 acquires already explained image data from the scanner 121 reading the test image. Next, the density information acquisition part 159 acquires information relating to the error of the density values (unintended darkness) from the acquired image data and processes the same. In the acquisition and/or processing of this information, the main area information (and nozzle information 149) held by the main area information holding part 151 may be utilized as well.

The correction amount setting part 161 in the correction part 139 determines the correction amount for correcting the unintended darkness based on the information relating to the density from the density information acquisition part 159. Specifically, in the present embodiment, the value of at least one of the high potential $V_{H'}$ and the low potential $V_{L'}$ prescribing the potential difference of the correction-use waveform W2 included in the waveform information 143 is set in accordance with the information relating to the density. In the setting of this correction amount, the main area information (and nozzle information 149) held by the main area information holding part 151 may also be utilized.

The initial setting part 163 in the correction part 139 designates the settings relating to corrections in units of the main areas 101 (performs initial setting). Specifically, in the present embodiment, the initial setting part 163 sets presence of any corrections with respect to each main area 101.

In other words, the initial setting part 163 groups the plurality of main areas 101 into correction areas 101A and non-correction areas 101B. In this grouping, for example, the main area information held by the main area information holding part 151 and the information acquired and processed by the density information acquisition part 159 may be utilized. The settings relating to corrections for the main areas 101 are for example used for generation and/or update of the information which is included in the waveform information 143 and identify which waveform between the waveform W1 before correction and the waveform W2 after correction is to be utilized.

Note that, in the present embodiment, the initial setting part 163 only sets presence of any correction. Therefore the initial setting part 163 does not use the information relating to the correction amount set by the correction amount setting part 161. However, as indicated by a broken line arrow, the information relating to the correction amount may be utilized as well. For example, the initial setting part 163 may assign the two or more types of correction amounts (which are not zero) set by the correction amount setting part 161 for the plurality of main areas 101 in units of the main areas 101 as well.

The re-setting part 165 in the correction part 139 maintains or redesignates the settings relating to corrections in units of the sub-areas 103. Note that, conceptually, redesignation of the settings relating to corrections in units of the sub-areas 103 are carried out only with respect to the sub-areas 103 needing redesignation. However, in the processing of the computer, for example, processing the same as redesignation may be carried out with respect to all sub-areas 103 and the initial settings may be maintained in part of the sub-areas 103 as a result. In the redesignation of the settings relating to corrections, for example, the main area information held by the main area information holding part 151, the information of the results of grouping by the initial setting part 163, and the sub-area information held by the sub-area information holding part 153 may be utilized. The settings relating to corrections for the sub-areas 103 are for example used for generation and/or update of the information which is included in the waveform information 143 and is relate to the ratio of the ejection elements 11 for which the waveform W2 after correction is utilized.

(Flow Charts)

Figure 14:
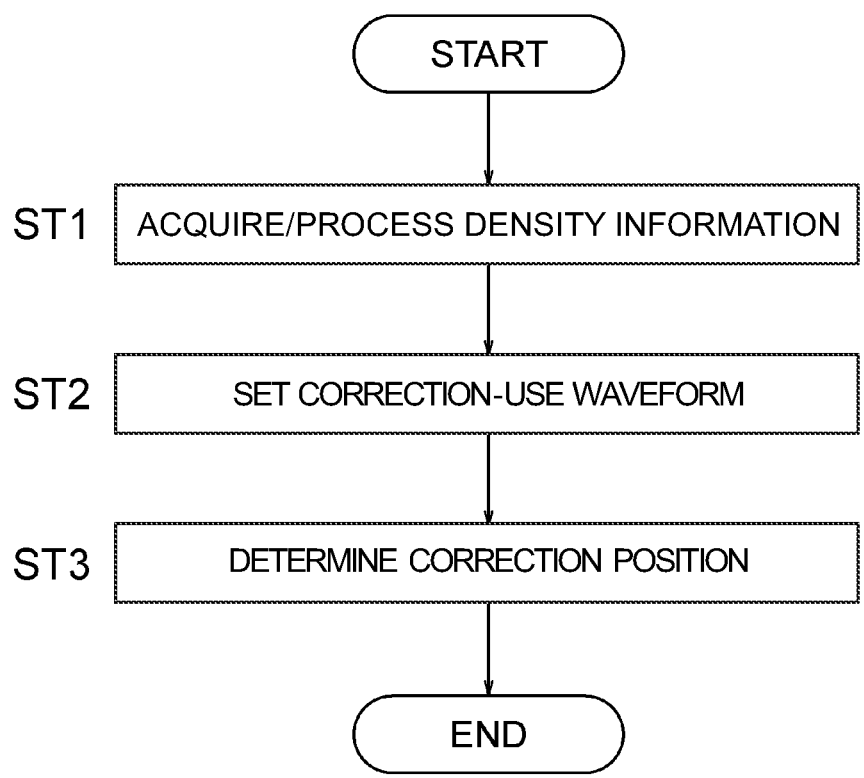
FIG. 14 is a flow chart showing an example of the procedure of processing for correction relating to darkness executed by the control part in the recording apparatus in FIG. 1.

FIG. 14 is a flow chart showing an example of the procedure of the processing for correction relating to darkness which is executed by the control part 123. This processing is executed before printing and corresponds to the operation of the correction part 139.

At step ST1, the control part 123 acquires and processes the information about error relating to the density values of the plurality of ejection elements 11. This processing corresponds to the operation of the density information acquisition part 159.

At step ST2, based on the information relating to the density which is acquired and processed at step ST1, the control part 123 sets information prescribing the waveform W2 for correction of the driving signal Sg1. This processing corresponds to the operation of the correction amount setting part 161.

At step ST3, the control part 123 determines the ejection elements 11 for which the corrections are carried out based on the information relating to density which is acquired and processed at step ST1. This processing corresponds to the operations of the initial setting part 163 and the re-setting part 165.

Note that, the orders of steps ST2 and ST3 may be reversed. Further, the conceptual general flow of processing is as explained above, but when viewed in detail, the orders of some steps may be partially switched as well.

Figure 15:
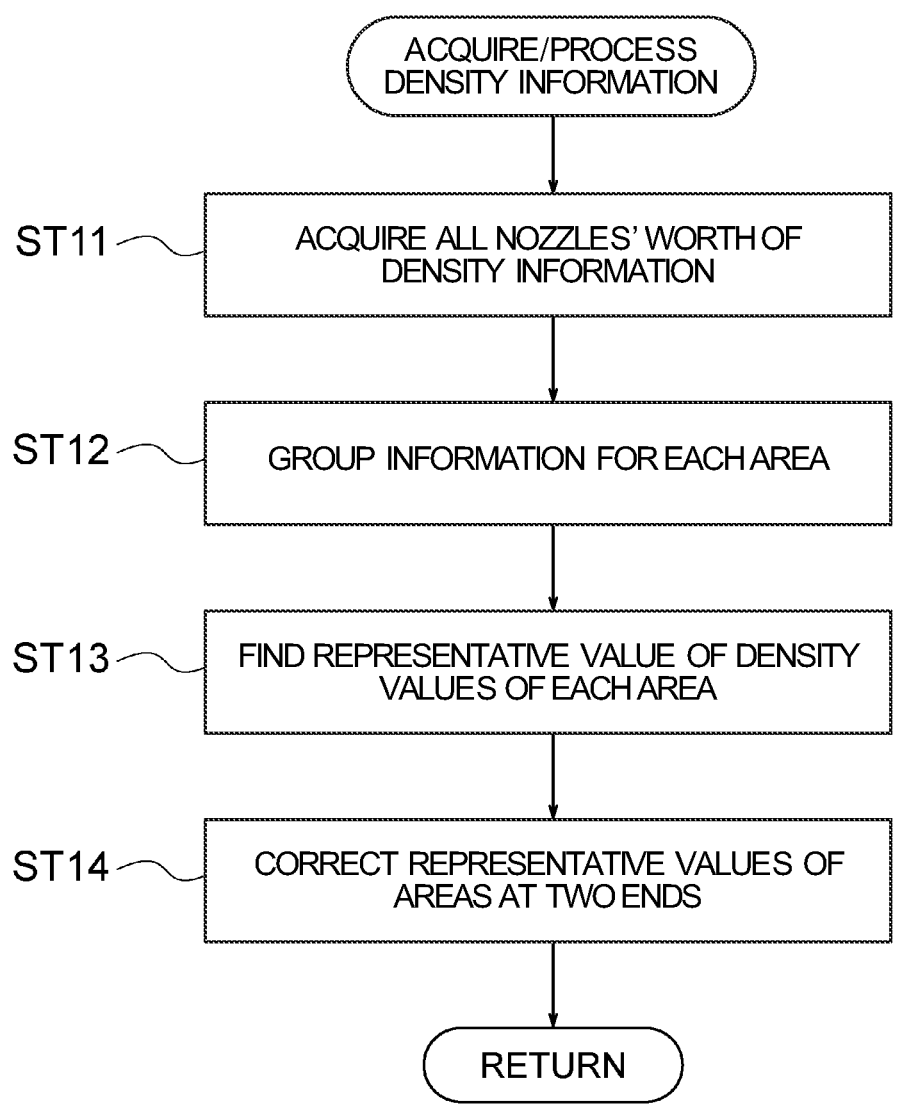
FIG. 15 is a flow chart showing details of step ST1 in FIG. 14.

FIG. 15 is a flow chart showing an example of details of step ST1 in FIG. 14.

At step ST11, the control part 123 acquires information relating to the density for all nozzles 3. In this processing, for example, the already explained image data of the test image from the scanner 121 and the nozzle information 149 may be utilized. Note that, although not particularly shown, the head 2 sometimes includes dummy nozzles not ejecting any liquid droplets. Such dummy nozzles contribute to reduction of variation of the ejection characteristics due to the ejection elements 11 not adjoining each other in the end parts of the head 2. When referring to "all nozzles 3", the dummy nozzles explained above are excluded. In the other processing as well, dummy nozzles may be excluded in the same way.

At step ST12, the control part 123 combines the density information of the individual nozzles 3 obtained at step ST11 for each main area 101 and defines the result as the information for each main area 101. In this processing, the main area information held by the main area information holding part 151 may be utilized.

At step ST13, the control part 123 calculates a representative value of the density values of each main area 101 from the density information of each main area 101 obtained at step ST12. The "representative value" is for example a mean value, a median value, or the most frequent value for all nozzles 3 belonging to each main area. In more detail, use may be made of the mean value. Use may be also made of a value found by a specific calculation method considering standard deviation etc. (that is, variation of densities).

At step ST14, the control part 123 corrects the representative values found at step ST13 for the main areas 101 at the two ends among the plurality of main areas 101. The main areas 101 at the two ends sometimes show abnormal values concerning the density values. Therefore, by correction of the representative values of the density values of the main areas 101 at the two ends, the accuracy of various processing which will be explained later can be improved. As the reason for detection of abnormal density values, for example, there can be mentioned the increase of the reflection light from the recording medium on the dots positioned at the end parts of the image since there are no dots at the peripheries at the time when the image is read by the scanner 121. Further, there can be mentioned correction for such a phenomenon being carried out in the scanner 121 on the image data.

Figure 16:
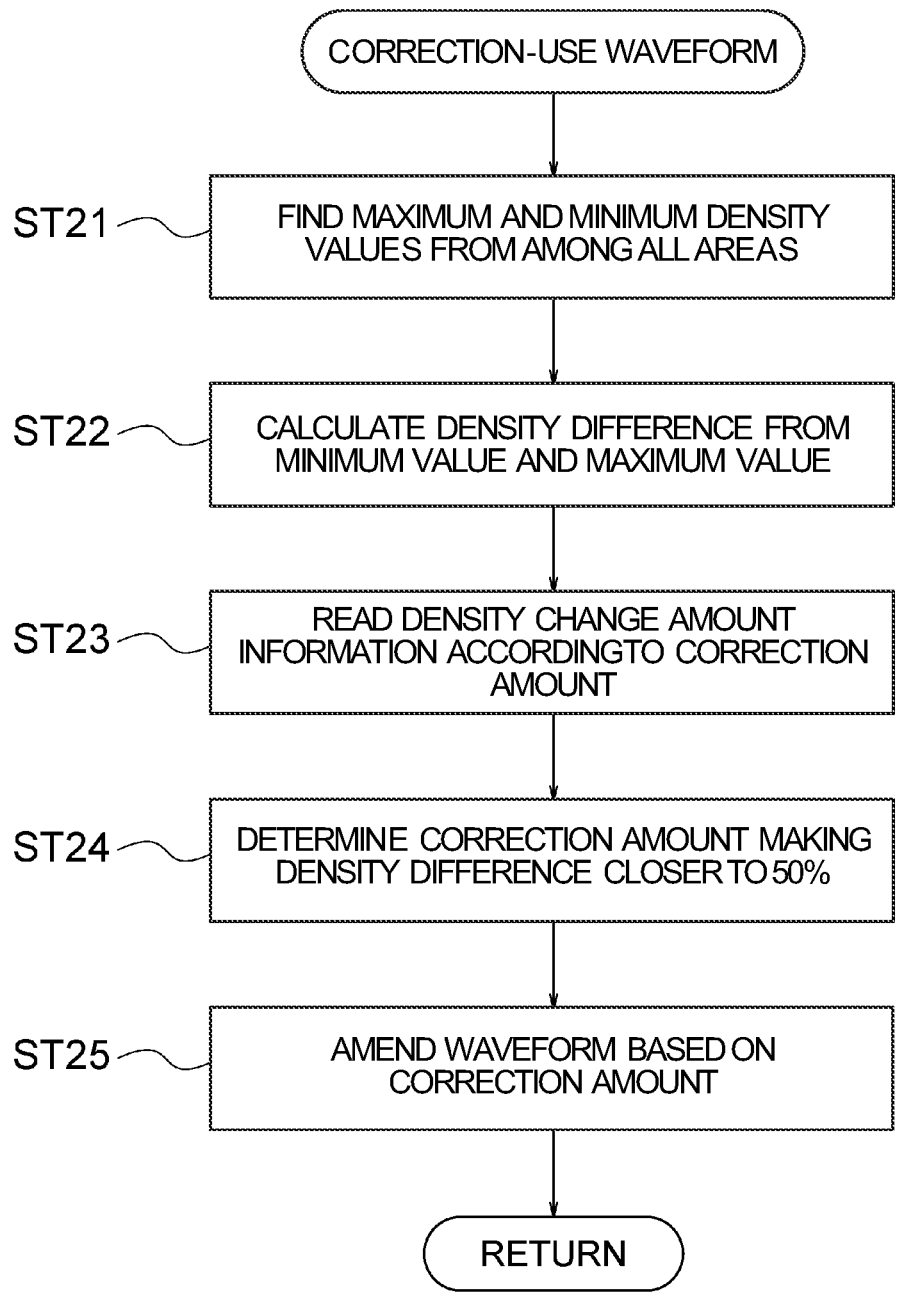
FIG. 16 is a flow chart showing details of step ST2 in FIG. 14.

FIG. 16 is a flow chart showing an example of details of step ST2 in FIG. 14.

At step ST21, the control part 123 identifies the maximum values and minimum values of the density values in the plurality of main areas 101 from the density values for each main area 101. The "density value for each main area 101" referred to here is the representative value of the density values for each main area 101 found in the processing in FIG. 15. The same is true for the density values of the other main areas 101 in the explanation of the present chart. However, at any step in the present chart, the maximum value and minimum value of the density values for each nozzle 3 may be suitably utilized as well.

At step ST22, the control part 123 calculates the difference between the minimum value and the maximum value of the density values (representative values) found at step ST21.

At step ST23, the control part 123 refers to data linking (or being capable of identifying linkage of) the correction amount of the driving signal Sg1 and amounts of actual changes of darkness (correction amounts, change amounts). This data is for example obtained by experiments etc. in advance and is included in the program 133. In the example of the present embodiment prescribing the correction amount of initial settings relating to the potential difference of the waveform W2, this data is for example held by linking various values of potential difference of the waveform W2 (or the high potential $V_{H'}$ and/or low potential $V_{L'}$) and actual density values in a case where the driving signals Sg1 are generated with the use of those various values.

At step ST24, the control part 123 searches through the data referred to at step ST23 and identifies the correction amount of the driving signal Sg1 making the difference between the maximum value and the minimum value found at step ST22 be reduced to about 50% (for example 40% to 60%). Reduction to about 50% is prescribed since, as will be understood from FIG. 5B, if a correction amount greatly reducing the difference between the minimum value and the maximum value, the difference of the density values indicated by the arrow y1 will become larger and conversely if a correction amount where the reduction of the difference between the minimum value and the maximum value is too small, the effects of correction are reduced. The identification of the correction amount of the driving signal Sg1 may be one selecting one from among a plurality of types of correction amounts recorded in the data in advance or may be one calculating the correction amount by interpolation of the above plurality of types of correction amounts.

At step ST25, based on the correction amount of the driving signal Sg1 identified at step ST24, the control part 123 generates information prescribing the waveform W2 for correction (for example the value of the high potential $V_{H'}$ and the low potential $V_{L'}$). In the actual processing of the computer, this operation, for example, may be update of the information relating to the waveform W2 included in the waveform information 143.

Figure 17:
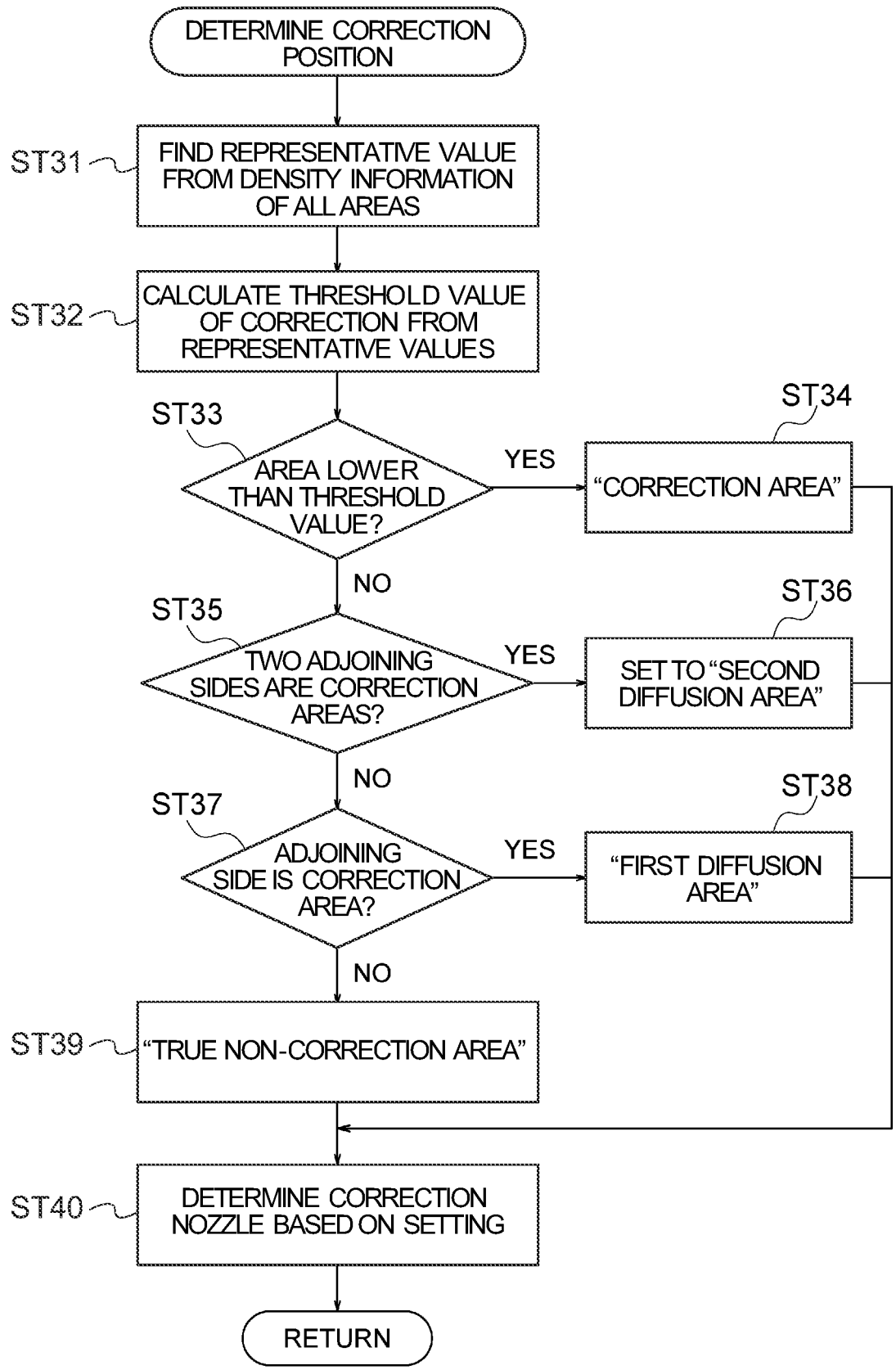
FIG. 17 is a flow chart showing details of step ST3 in FIG. 14.

FIG. 17 is a flow chart showing an example of details of step ST3 in FIG. 14.

At step ST31, the control part 123 calculates a representative value of the density values of all main areas 101 from the density information of all main areas 101. The density values used for calculation of the representative value may be the density values of the nozzles 3 at step ST11 or may be the representative values for each main area 101 at step ST13. Further, the representative value is for example the mean value, median value, or the most frequent value. The mean value may be used. Use may be also made of a value found by a specific calculation method considering standard deviations and the like (that is the variation of densities).

At step ST32, based on the representative value calculated at step ST31, the control part 123 sets a threshold value (judgment standard) for when grouping the plurality of main areas 101 into the correction areas 101A and the non-correction areas 101B. If the representative value of the density values of each main area 101 is lower than this threshold value, that main area 101 is grouped as a correction area 101A. As this threshold value, for example, the representative value calculated at step ST31 may be used as it is, or a value obtained by applying predetermined processing to the representative value may be used.

For example, a value obtained by subtracting a predetermined constant from the mean value used as the representative value may be used as the threshold value. In the present embodiment, in the corrections in units of the sub-areas 103, the ratio of increase of the correction amount in a non-correction area 101B is larger than the ratio of subtraction of the correction amount in a correction area 101A. Accordingly, by setting a value smaller than the mean value as the threshold value, the probability that the image will end up becoming darker as a whole can be lowered. The specific value of the constant to be subtracted from the mean value may be included in advance in the program 133, may be set based on the information of densities obtained at step ST11, or may be set by the user. The value of this constant may be made for example, in terms of the density value (OD value), 0.001 to 0.010. For example, it may be made 0.006.

Steps ST33 to ST39 show the procedure for grouping the plurality of main areas 101 into the correction areas 101A, first diffusion areas 101D, second diffusion areas 101E, and true non-correction areas 101F based on the threshold value etc. set at step ST32. However, here, in order to show the conditions by which the areas are grouped into these various areas in an easily understandable manner, strictness of the procedure of processing is ignored.

At step ST33, the control part 123 judges whether the representative value of the density values of each main area 101 is lower than the threshold value set at step ST32. Further, when judging yes, the control part 123 proceeds to step ST34 and groups that main area 101 as a correction area 101A. Steps ST33 and ST34 correspond to the operation in the initial setting part 163. When judging no at step ST33, the control part 123 proceeds to step ST35.

At step ST35, the control part 123 judges whether correction areas 101A are positioned next to the two sides of a main area 101 which was not grouped as a correction area 101A at step ST33. Further, when judged yes, the control part 123 proceeds to step ST36 and groups that main area 101 as a second diffusion area 101E. Steps ST35 and ST36 correspond to the operation of the re-setting part 165. When judged no at step ST35, the control part 123 proceeds to step ST37.

Note that, step ST35 (and ST37 which will be explained later) is for judging whether a non-correction area 101B adjoins correction areas 101A, therefore is predicated on all main areas 101 being judged if they are correction areas 101A and set by steps ST33 and ST34. However, in the present chart, strict illustration concerning this point is omitted.

At step ST37, the control part 123 judges whether a main area 101 which was not grouped as a second diffusion area 101E at step ST35 adjoins a correction area 101A. Further, when judged yes, the control part 123 proceeds to step ST38 and groups that main area 101 as a first diffusion area 101D. Steps ST37 and ST38 correspond to the operation of the re-setting part 165. When judged no at step ST37, the control part 123 proceeds to step ST39.

At step ST39, the control part 123 sets a main area 101 which has not been grouped into any of a correction area 101A, second diffusion area 101E, and first diffusion area 101D in the steps up to here as a true non-correction area 101F. Note that, in the processing of the computer, the settings of the main areas 101 which were judged as no at step ST33 and were grouped as non-correction areas 101B may be maintained as they are as well (the processing need not be carried out at step ST39 either).

The judgments and settings shown at steps ST33 to ST39 are executed with respect to all main areas 101. In the present chart, strict illustration concerning this point is omitted.

At step ST40, based on the settings carried out at steps ST33 to ST39, the control part 123 sets the presence of any corrections (which of the waveforms W1 and W2 is used) and the like for the plurality of nozzles 3. Specifically, for example, for each ejection element 11, the control part 123 judges to which of the correction area 101A, first diffusion area 101D, second diffusion area 101E, and true non-correction area 101F the main area 101 or sub-area 103 to which that ejection element 11 belongs is grouped. Further, based on the judgment result, the control part 123 generates or updates the information which is included in the waveform information 143 and which identifies which of the waveforms W1 and W2 the waveform of the driving signal Sg1 input to each ejection element 11 is.

Note that, as will be understood from the above explanation, even if saying the settings relating to corrections are designated in units of the main areas 101 or units of the sub-areas 103, in the end, the settings relating to corrections may be designated for each ejection element 11 (the values of the parameters prescribing the settings may be held in the waveform information 143 for each ejection element 11) based on the settings in units of the main areas 101 or units of the sub-areas 103.

Figure 18:
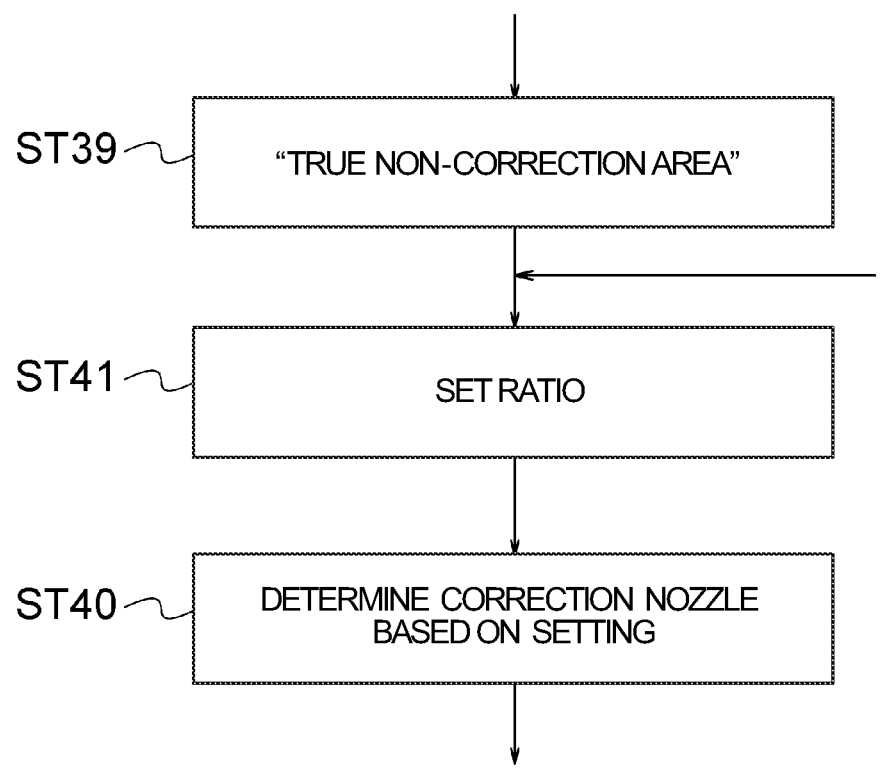
FIG. 18 is a flow chart showing a portion of a modification in FIG. 17.

FIG. 18 is a flowchart showing a portion of the modification in FIG. 17.

As already explained, the ratio of the ejection elements 11 to which the driving signal Sg1 having the waveform W2 after correction is input in each sub-area 103 and/or the difference of the ratios between the mutually adjoining sub-areas 103 may be fixed or may be variable. Here, a mode where the control part 123 sets the ratio and/or difference of the ratios explained above is illustrated.

In the example shown, the control part 123 (in more detail, the re-setting part 165) sets the above ratio and/or difference of the ratios (step ST41) after step ST39 and before step ST40. Specifically, for example, based on the information obtained before step ST41, the re-setting part 165 generates and/or updates the information of the above in each sub-area 103 and/or the difference of the ratios between the mutually adjoining sub-areas 103, which is included in the waveform information 143.

The algorithm at this time may be made a suitable one. For example, the amount of change of density of the sub-area 103 is estimated by (density according to waveform W2−density according to waveform W1)×above ratio. The ratio explained above may be reversely calculated so that the estimated amount of change of the density becomes a target value or falls into a permissible range. The target value or permissible range may be suitably set. For example, it may be obtained by multiplying the density difference found at step ST22 by a predetermined proportion.

As explained above, in the present embodiment, the printer 1 has the head 2 and the control part 123 which controls the head 2. The head 2 has the facing surface 2a and the plurality of recording elements (ejection elements 11). The facing surface 2a faces the recording medium (printing paper P). The plurality of ejection elements 11 are different from each other in positions in a predetermined direction (D2 direction) along the facing surface 2a and individually form the plurality of dots configuring the image on the recording medium. The control part 123 has the correction part 139 which corrects the signal information (for example waveform information 143) prescribing the driving signals Sg1 individually input to the plurality of ejection elements 11. The correction part 139 has the main area information holding part 151, sub-area information holding part 153, initial setting part 163, and re-setting part 165. The main area information holding part 151 holds the information prescribing the plurality of main areas 101 which are obtained by dividing at least a portion in the facing surface 2a of the head 1 into a plurality of areas in the D2 direction and to each of which two or more ejection elements 11 belong. The sub-area information holding part 153 holds, for at least one of the plurality of main areas 101, the information prescribing the plurality of sub-areas 103 which are obtained by dividing the main area 101 into a plurality of areas in the D2 direction and to each of which two or more ejection elements 11 belong. The initial setting part 163 designates the settings relating to corrections including the presence of any corrections in units of the main areas 101. In a case where the correction amounts of darkness based on the initial setting are different between the first main area (for example the N+1-th main area 101 in FIG. 7) and the second main area (for example the N-th main area 101 in FIG. 7) which adjoin each other among the plurality of main areas 101, the re-setting part 165 maintains or redesignates the settings relating to corrections designated with respect to the first main area in units of the sub-areas 103. Further, the re-setting part 165 redesignates the settings so as to obtain a correction amount between the correction amount by the original settings and the correction amount of the second main area with respect to the sub-area 103A in the first main area adjoining the second main area.

From another viewpoint, the program 133 is a program for a recording apparatus making the computer 124 connected to the head 2 function as the control part 123. The head 2 and control part 123 have the above configurations.

Accordingly, for example, due to the designation of the settings relating to corrections in units of the main areas 101, the processing load is lightened and/or the amount of the memory used is reduced. Further, the difference of the correction amounts between the main areas 101 is reduced in units of the sub-areas 103, therefore the probability of increase of the difference of the density values among the main areas 101 can be lowered, therefore the image quality is improved. Since the difference of the correction amounts is reduced by designation of the settings relating to corrections in units of the sub-areas 103, the increase of processing load and/or increase of the amount of the memory used is suppressed.

Further, in the present embodiment, the initial setting part 163 designates settings by which mutually the same first corrections (corrections using the waveform W2 in place of the waveform W1 in the present embodiment) are performed for all ejection elements 11 in a second main area (for example the N-th main area 101 in FIG. 7) with respect to the second main area. The re-setting part 165 increases the ratio of the number of the ejection elements 11 for which the first corrections explained before are carried out in the sub-area 103 in the first main area (for example the N+1-th main area 101 in FIG. 7) which is the closest to the second main area side.

In this case, for example, compared with a case where the potential difference of the driving signals Sg1 is changed or the number of waves is changed to make the correction amounts closer, the correspondence between the operation amounts (change of the ratio) and the control amounts (actual change amounts of darkness) is clear. Accordingly, the difference of darkness can be reduced with a high accuracy.

Further, in the present embodiment, the above first correction changes the waveform W1 in the driving signal Sg1 where the correction is not carried out to the correction-use waveform W2.

In this case, for example, due to adjustment of the correction amounts in the sub-areas 103, a plurality of types of correction amounts become necessary. However, the waveforms of the driving signal Sg1 may be the two types of the waveform before correction and waveform for correction. Accordingly, a large number of types of waveforms need not be prepared, so the processing load is lightened and/or the amount of the memory used is reduced.

Further, as shown in the modification, the re-setting part 165 may be able to change the amount of increase when increasing the ratio of the number of the ejection elements 11 for which the above first correction is carried out.

In this case, for example, it is made easier to set the above ratio to a suitable size for each printer 1. That is, by making the above ratio match the manufacturing tolerance of each printer 1, the accuracy of correction can be improved. Further, for example, by performing the operation of adjusting the above ratio at a suitable timing during a period where the printer 1 is used, it becomes possible to make the above ratio match aging of the printer 1. As described above, by making the above ratio match manufacturing tolerances or aging, for example, the probability that the densities in the diffusion areas 101 (101D and 101E) will become too high (or too low) is lowered. In turn, for example, it is made easier to control the density difference in the head 2 as a whole to a desired level (for example 50% or less).

Further, in the present embodiment, the initial setting part 163 assigns any of the two types of settings of non-correction and correction to the plurality of main areas 101. One of a first main area and a second main area explained above (for example the N+1-th main area 101 in FIG. 7) is a non-correction area 101B to which the setting of non-correction is assigned. The other of the first main area and second main area (for example the N-th main area 101 in FIG. 7) is a correction area 101A to which the setting of correction is assigned.

In this case, for example, since there are two types of initial settings, the processing load is lightened and/or the amount of the memory used is reduced. Further, a first main area is an area where correction is not carried out in the initial settings. Therefore, when the ratio by which the first correction to be carried out in the second main area explained above is carried out in the first main area is increased, the first correction is not one carried out in place of the other correction. Accordingly, the relationship between the change (operation amount) of the ratio and the actual change amount (control amount) of darkness is clear. Further, the change of the operation amount easily appears in the control amount.

Further, in the present embodiment, the number of the sub-areas 103 in a first main area (for example the N+1-th main area 101 in FIG. 7) is three or more. For the three or more sub-areas 103 in the first main area which continue from a second main area (for example the N-th main area 101 in FIG. 7), the re-setting part 165, maintains or redesignates the settings which are designated with respect to the first main area so that the closer a sub-area 103 to the second main area, the closer the correction amount of darkness becomes to the correction amount of darkness in the second main area (see the first diffusion area 101D or second diffusion area 101E).

In this case, for example, compared with a mode where the correction amount is reset only in one sub-area 103 adjoining the second main area (this mode is also included in the art according to the present disclosure), the density gradually changes, therefore the difference of density values can be reduced more.

In the present embodiment, all sub-areas 103 in a first main area (for example the N+1-th main area 101 in FIG. 7) have the same sizes as each other.

In this case, for example, the processing or recording of information with respect to the plurality of sub-areas 103 can be made common. As a result, the processing load is lightened and/or the amount of the memory used can be reduced.

Further, in the present embodiment, the re-setting part 165 maintains or redesignates the settings relating to corrections designated with respect to a second main area (for example the N-th main area 101 in FIG. 7) in units of the sub-areas 103. Further, for the sub-area 103A in the second main area which adjoins a first main area (for example the N+1-th main area 101 in FIG. 7), the re-setting part 165 redesignates the settings for acquiring a correction amount (see the ratio 85% of the waveform W2 in FIG. 7) between the correction amount (see the ratio 100% of the waveform W2 in FIG. 7) by the original settings and the correction amount (see the ratio 70% of the waveform W2 in FIG. 7) according to the redesignation in the sub-area 103 in the first main area adjoining the second main area.

In this case, since, example, the plurality of sub-areas 103 are provided not only in a first main area, but also in a second main area, it is easy to increase the number of the sub-areas 103. As a result, the effect of reducing the difference of the density values becomes easier to obtain.

Note that, although not particularly shown, the sub-areas 103 need not be provided in a second main area either. In this case, for example, the processing concerning the sub-areas 103 is completed in only the first main area. As a result, the processing load is lightened, and/or the amount of the memory used can be reduced.

Further, in the present embodiment, the number of the sub-areas 103 in a second main area (for example the N-th main area 101 in FIG. 7) is smaller than the number of the sub-areas 103 in a first main area (for example the N+1-th main area 101 in FIG. 7).

In this case, for example, by providing a relatively large number of sub-areas 103 in the first main area, the correction amount of density values is gradually changed, whereby the difference of the density values can be reduced. On the other hand, in the second main area, by making the number of the sub-areas 103 smaller, the processing load is lightened, and/or the amount of the memory used can be reduced. By making the region where the correction amount is gradually changed concentrate to one main area 101, the influence of the change of the correction amount exerted upon the intended darkness can be reduced.

Note that, in the above embodiment, the printer 1 is one example of a recording apparatus. The ejection element 11 is one example of a recording element. The waveform information 143 (for example the values of the high potential $V_H$ and low potential $V_L$ of the driving signal Sg1 etc.) is one example of the signal information prescribing the driving signal.

The art according to the present disclosure is not limited to the above embodiment and may be executed in various ways.

The recording apparatus is not limited to an inkjet printer. For example, it may be a thermal printer which gives heat to a thermal paper or ribbon as well. In this case, the plurality of recording elements are a plurality of heating parts which are arranged so as to give heat to the thermal paper or ribbon. The heating part for example has a heat generator layer, a common electrode positioned on the heat generator layer, and individual electrodes which are positioned on the heat generator layer and face the common electrode. The driving signal is input to the individual electrodes.

The correction method in the present disclosure need not be carried out with respect to all recording elements provided in the head. For example, sometimes a recording element positioned at an end part of the head is different in ejection characteristics from the other recording elements and a certain trend can be seen in the difference. That is, sometimes there is a unique region in the head. The region where the plurality of recording elements are arranged excluding such a unique region may be divided into a plurality of main areas as well. Further, for the unique region, a different algorithm from the designation of the settings relating to corrections in the main areas may be used to designate the settings relating to corrections.

In the embodiment, provision was made of a first diffusion area 101D and a second diffusion area 101E each having three or more sub-areas 103 gradually changing in correction amount by the re-setting. Such diffusion areas need not be provided either. That is, as in the N-th main area 101 in FIG. 7, only one sub-area for which the setting of correction is redesignated need be provided in the main area as well. Further, in the present embodiment, a non-correction area was deemed to be a diffusion area, but a correction area may be deemed to be a diffusion area as well.

In the embodiment, the threshold value of correction was set based on the mean value of densities (step ST32), and the plurality of main areas were grouped as correction areas and non-correction areas by comparing this threshold value of correction and the mean value of densities of each main area (step ST33). In such grouping, variation of densities may be considered as well. For example, at step ST13, after the mean value of densities of each main area is calculated, the deviation value of density of each main area (corresponding to the representative value at step ST13) is calculated by using this mean value. Further, at steps corresponding to steps ST31 and ST32, the deviation value which becomes the threshold value of correction is suitably set within a range less than 50. Further, at step ST33, it is judged whether the deviation value of each main area is lower than the deviation value as the threshold value of correction, and a main area with a lower value is identified as a correction area (step ST34). Note that, in a case where correction is carried out so that the density of the main area having a relatively high density becomes low, conversely to that described above, a main area having a higher deviation value than the threshold value of correction set in a range exceeding 50 is identified as the correction area.

REFERENCE SIGNS LIST

1 . . . printer, 2 . . . head, 2a . . . facing surface, 11 . . . ejection element (recording element), 101 . . . main area (first main area, second main area), 103 . . . sub-area, 123 . . . control part, 139 . . . correction part, 151 . . . main area information holding part, 153 . . . sub-area information holding part, 163 . . . initial setting part, 165 . . . re-setting part, and P . . . printing paper (recording medium).

The invention claimed is:

1. A recording apparatus comprising:
   a head comprising
      a facing surface which faces a recording medium and
      a plurality of recording elements which are different from each other in positions in a predetermined direction along the facing surface and individually form a plurality of dots configuring an image on the recording medium; and a control part which controls the head, wherein the control part comprises a correction part which corrects signal information prescribing driving signals which are individually input to the plurality of recording elements, and the correction part comprises a main area information holding part holding information defining a plurality of main areas which are obtained by dividing at least a portion in the facing surface into a plurality of areas in the predetermined direction and to each of which two or more recording elements of the plurality of recording elements belong, a sub-area information holding part holding, for at least one of the plurality of main areas, information defining a plurality of sub-areas which are obtained by dividing the at least one of the plurality of main areas into another plurality of areas in the predetermined direction and to each of which two or more recording elements of the plurality of recording elements belong, an initial setting part which designates settings relating to corrections in each of the plurality of main areas, the settings including presence of any corrections, and a re-setting part, wherein, when correction amounts of darkness based on the settings are different between a first main area and a second main area which adjoin each other among the plurality of main areas, the re-setting part maintains or redesignates settings relating to corrections designated with respect to the first main area in each of the plurality of sub-areas, and redesignates a setting with respect to a sub-area being in the first main area and adjoining the second main area so as to acquire a correction amount between the correction amount by its original setting and the correction amount of the second main area.

2. The recording apparatus according to claim 1, wherein the initial setting part designates a setting performing mutually a same first correction for all of the plurality of recording elements in the second main area with respect to the second main area, and the re-setting part increases a ratio of the number of the plurality of recording elements for which the same first correction is carried out in the sub-area being in the first main area and being the closest to the second main area.

3. The recording apparatus according to claim 2, wherein the same first correction is one changing a waveform where correction is not carried out to a correction-use waveform in the driving signal.

4. The recording apparatus according to claim 2, wherein the re-setting part is able to change an amount of increase when increasing the ratio.

5. The recording apparatus according to claim 1, wherein the initial setting part assigns any of only two types of settings of non-correction and correction with respect to the plurality of main areas, one of the first main area and second main area is a non-correction area to which the setting of non-correction is assigned, and the other of the first main area and second main area is a correction area to which the setting of correction is assigned.

6. The recording apparatus according to claim 1, wherein a number of the sub-areas in the first main area is three or more, and the re-setting part maintains or redesignates the settings designated with respect to the first main area for at least three sub-areas among the three or more sub-areas which continue from the second main area so that the closer the sub-area is to the second main area, the closer the correction amount of darkness of the sub-area is to the correction amount of darkness in the second main area.

7. The recording apparatus according to claim 6, wherein all of the sub-areas in the first main area have a same size.

8. The recording apparatus according to claim 1, wherein the re-setting part maintains or redesignates the settings relating to corrections which were designated with respect to the second main area in each of the plurality of sub-areas, and redesignates a setting with respect to a sub-area being in the second main area and adjoining the first main area so as to obtain a correction amount between the correction amount of its original setting and the correction amount due to the redesignation in the sub-area being in the first main area and adjoining the second main area.

9. The recording apparatus according to claim 8, wherein a number of the sub-areas in the second main area is smaller than a number of the sub-areas in the first main area.

10. The recording apparatus according to claim 5 wherein the first main area is the non-correction area, and the second main area is the correction area.

11. A non-transitory computer-readable recording medium that stores a computer program for causing a recording apparatus including a printing head that includes a facing surface to face the recording medium and that forms a plurality of dots configuring an image on a recording medium, to execute:

obtaining, from a memory, main area information that defines a plurality of main areas which are obtained by dividing at least a portion of the printing surface into a plurality of areas in the predetermined direction, the plurality of main areas comprising a first main area and a second main area that is next to the first area obtaining, from the memory, sub-area information that defines a plurality of sub-areas which are obtained by dividing at least one of the plurality of main areas into another plurality of areas in the predetermined direction;

designating settings relating to corrections in each of the main areas, the setting including presence of any corrections, and maintaining or re-designating, when correction amounts of darkness based on the settings are different between the first main area and the second main area, the settings relating to corrections designated with respect to the first main area in each of the plurality of sub-areas and re-designating a setting with respect to a sub-area being in the first main area and adjoining the second main area so as to acquiring a correction amount between a correction amount by its original setting and a correction amount of the second main area.

* * * * *